(12) United States Patent
Hirao

(10) Patent No.: US 9,388,504 B2
(45) Date of Patent: Jul. 12, 2016

(54) PLATING APPARATUS AND PLATING METHOD

(71) Applicant: EBARA CORPORATION, Toyko (JP)

(72) Inventor: Tomonori Hirao, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 14/223,972

(22) Filed: Mar. 24, 2014

(65) Prior Publication Data
US 2014/0295093 A1 Oct. 2, 2014

(30) Foreign Application Priority Data

Mar. 26, 2013 (JP) ................................. 2013-063800
Mar. 28, 2013 (JP) ................................. 2013-069729

(51) Int. Cl.
| | |
|---|---|
| *B65G 45/26* | (2006.01) |
| *C25D 17/06* | (2006.01) |
| *C23C 18/16* | (2006.01) |
| *B65G 45/24* | (2006.01) |
| *B65G 45/10* | (2006.01) |
| *B65G 45/22* | (2006.01) |
| *C25D 17/00* | (2006.01) |

(52) U.S. Cl.
CPC ................ *C25D 17/06* (2013.01); *B65G 45/10* (2013.01); *B65G 45/22* (2013.01); *B65G 45/24* (2013.01); *B65G 45/26* (2013.01); *C23C 18/163* (2013.01); *C23C 18/1628* (2013.01); *C23C 18/1632* (2013.01); *C23C 18/1675* (2013.01); *C25D 17/001* (2013.01)

(58) Field of Classification Search
CPC ....... C25D 17/08; C23C 18/163; B65G 45/10; B65G 45/22; B65G 45/24; B65G 45/26
See application file for complete search history.

(56) References Cited

U.S. PATENT DOCUMENTS

2013/0122704 A1* 5/2013 Kanda ............... H01L 21/76838
438/678

FOREIGN PATENT DOCUMENTS

| JP | 11-315383 | 11/1999 |
|---|---|---|
| JP | 2003-247098 | 9/2003 |

* cited by examiner

*Primary Examiner* — Dah-Wei D Yuan
*Assistant Examiner* — Stephen Kitt
(74) *Attorney, Agent, or Firm* — Baker & Hostetler LLP

(57) ABSTRACT

A plating apparatus includes a processing bath configured to store a processing liquid therein, a transporter configured to immerse a substrate holder, holding a substrate, in the processing liquid, raise the substrate holder out of the processing bath, and transport the substrate holder in a horizontal direction, and a gas flow generator configured to generate a clean gas flow forward of the substrate with respect to a direction in which the substrate holder is transported. The transporter moves the gas flow generator together with the substrate holder in the horizontal direction while transporting the substrate holder in the horizontal direction.

6 Claims, 36 Drawing Sheets

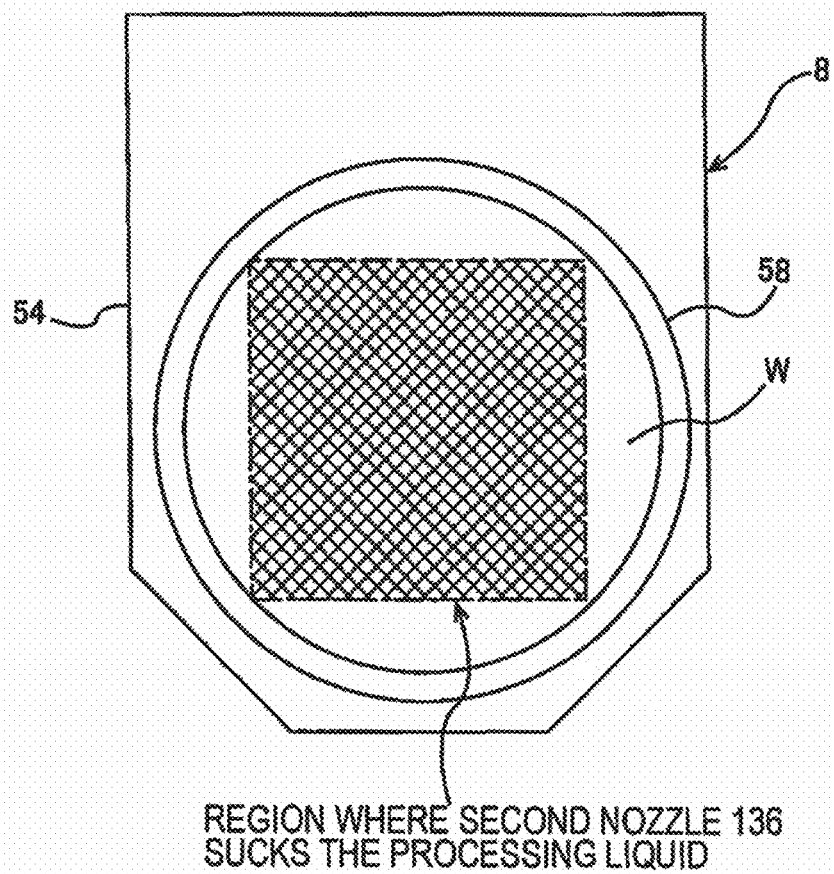

PLATING APPARATUS AND PLATING METHOD

CROSS REFERENCE TO RELATED APPLICATIONS

This document claims priorities to Japanese Patent Application Number 2013-063800 filed Mar. 26, 2013 and Japanese Patent Application Number 2013-069729 filed Mar. 28, 2013, the entire contents of which are hereby incorporated by reference.

BACKGROUND

It is a common practice in TAB (tape automated bonding) or flip chip to form protruding connection electrodes (i.e., bumps) of gold, copper, solder or nickel, or of multiple layers of such metals at predetermined portions (electrodes) of a surface of a semiconductor chip having interconnects formed therein so that the semiconductor chip can be electrically coupled via the bumps to substrate electrodes or TAB electrodes. There are various methods usable for forming the bumps, such as electroplating, vapor deposition, printing, and ball bumping. In recent years, electroplating, which can form fine bumps and can be performed in a relatively stable manner, has been widely used, as the number of I/O in a semiconductor chip increases and the electrode pitch becomes smaller.

The electroplating method can be classified roughly into a jet method (or a cup method) and a dip method. According to the jet method, a substrate, such as a semiconductor wafer, is held in a horizontal position with a surface, to be plated, facing downward, and a plating solution is jetted upward onto the surface to plate the substrate. According to the dip method, a substrate is held in a vertical position in a plating bath and a plating solution is injected upward into the plating bath, while the plating solution overflows the plating bath during plating. Electroplating using the dip method has advantages of a small footprint and good release of bubbles which could adversely affect a quality of plating. Moreover, the electroplating using the dip method can be easily applied to a variety of wafer sizes. Therefore, the dip method is considered suitable for bump plating in which plating is performed on relatively large-sized holes and which requires a considerably long plating time.

Japanese laid-open patent publication No. 11-315383 discloses a technology for generating a downward air flow in a clean room that houses a plating apparatus therein to increase the cleanliness in the clean room for thereby preventing particles from being attached to a surface, to be plated, of a substrate when the substrate is transported in the clean room. However, in the dip electroplating process, since a processing bath exists below the substrate that is being transported, the processing bath presents an obstacle to the formation of the downward air flow. Hence it is difficult to generate a uniform downward air flow. Therefore, particles that are suspended in the air in the clean room cannot fully be removed, and as a result the particles are liable to be attached to the surface of the substrate.

Furthermore, in the dip electroplating process, after the substrate has been dipped in the processing liquid in the processing bath and then raised from the processing bath, the substrate is transported in the horizontal direction while the substrate is kept in a vertical position. As a consequence, the particles suspended in the air in the clean room are likely to be attached to the surface of the substrate that has been plated.

A dip electroplating apparatus typically has a substrate holder for holding a substrate in a vertical position. This substrate holder has a scaling member that defines a hermetically closed space surrounding a peripheral portion of the substrate, with feeding electrodes disposed in this hermetically closed space. The substrate is held by the substrate holder in a state such that the surface, to be plated, of the substrate is exposed. The substrate and the substrate holder are immersed together in the plating solution, and the exposed surface of the substrate is plated in the processing bath.

A plating apparatus performs various processes, such as a pre-treating process and a rinsing process, as well as the plating process, on the substrate. During these various processes, the substrate, together with the substrate holder, is immersed in respective processing liquids. When the substrate is raised from the processing bath, the processing liquid remains on the substrate and the substrate holder. If the substrate holder is transported with the processing liquid remaining thereon, the processing liquid may drop from the substrate holder, thus possibly causing contamination. Moreover, if the substrate holder, with the processing liquid remaining thereon, is moved to a subsequent processing bath, the processing liquid remaining on the substrate holder is mixed into a different processing liquid in the subsequent processing bath, adversely affecting the processing of the substrate in the subsequent processing bath.

Attempts have been made in order to remove the processing liquid from the substrate and the substrate holder via gravity drop. For example, the substrate holder is lifted at a reduced speed from the processing bath, and kept above the processing bath after having been lifted therefrom. However, these approaches are liable to increase a takt time of the plating apparatus and as a result reduce a throughput.

SUMMARY OF THE INVENTION

It is a first object to provide a plating apparatus and a plating method which are capable of transporting a substrate without permitting particles to be attached to a surface of the substrate.

A second object is to provide a plating apparatus and a plating method which are capable of removing a processing liquid remaining on a substrate without causing a reduction in a throughput.

In an embodiment, a plating apparatus for plating a surface of a substrate, such as a wafer or the like, is provided. More particularly, a plating apparatus having a gas flow generator for generating a clean gas flow is provided. A plating method including a step of transporting a substrate while generating a clean gas flow is also provided.

In an embodiment, a plating apparatus having a suction mechanism for sucking a processing liquid used in a plating process is provided. A plating method including a step of sucking a processing liquid used in a plating process to thereby remove the processing liquid from a substrate is also provided.

In an embodiment, a plating apparatus includes: a processing bath configured to store a processing liquid therein; a substrate holder configured to hold a substrate; a transporter configured to immerse the substrate holder, holding the substrate, in the processing liquid held in the processing bath, raise the substrate holder out of the processing bath, and transport the substrate holder in a horizontal direction; and a gas flow generator configured to generate a clean gas flow forward of the substrate with respect to a direction in which the substrate holder is transported, the transporter being configured to move the gas flow generator together with the substrate holder in the horizontal direction while transporting the substrate holder in the horizontal direction.

In an embodiment, a plating method includes: holding a substrate with a substrate holder, immersing the substrate holder, holding the substrate, in a processing liquid held in a processing bath; raising the substrate holder out of the processing bath; transporting the substrate holder together with the substrate in a horizontal direction; and while transporting the substrate holder in the horizontal direction, generating a clean gas flow forward of the substrate with respect to a direction in which the substrate holder is transported.

In an embodiment, a plating apparatus includes a processing bath configured to store a processing liquid therein; a substrate holder configured to hold a substrate with a sealing member pressing the substrate; a transporter configured to immerse the substrate holder, holding the substrate, in the processing liquid stored in the processing bath, raise the substrate holder out of the processing bath, and transport the substrate holder in a horizontal direction; a suction mechanism configured to suck the processing liquid remaining on the substrate held by the substrate holder, and a moving mechanism configured to move the suction mechanism relative to the substrate holder, the suction mechanism being mounted to the moving mechanism, the moving mechanism being mounted to the transporter, and the transporter being configured to move the suction mechanism and the moving mechanism together with the substrate holder in the horizontal direction while transporting the substrate holder in the horizontal direction.

In an embodiment, a plating method includes: holding a substrate with a substrate holder while pressing a sealing member against the substrate; immersing the substrate holder, holding the substrate, in a processing liquid held in a processing bath; raising the substrate holder out of the processing bath; transporting the substrate holder together with the substrate in a horizontal direction; and sucking the processing liquid remaining on the substrate, while transporting the substrate holder in the horizontal direction.

With the plating apparatus and the plating methods according to the embodiments, the clean gas flow is generated forward of the substrate, held by the substrate holder, with respect to the direction in which the substrate holder is transported. The substrate can thus be transported without having particles attached to the surface of the substrate.

Furthermore, while the substrate holder is being transported in the horizontal direction, the suction mechanism can suck the processing liquid that remains on the substrate. Therefore, the processing liquid on the substrate can be removed without lowering the throughput.

BRIEF DESCRIPTION OF THE DRAWINGS

FIG. 30 is a view showing a region where the second suction nozzles suck the processing liquid;

DETAILED DESCRIPTION OF EMBODIMENTS

Figure 1:
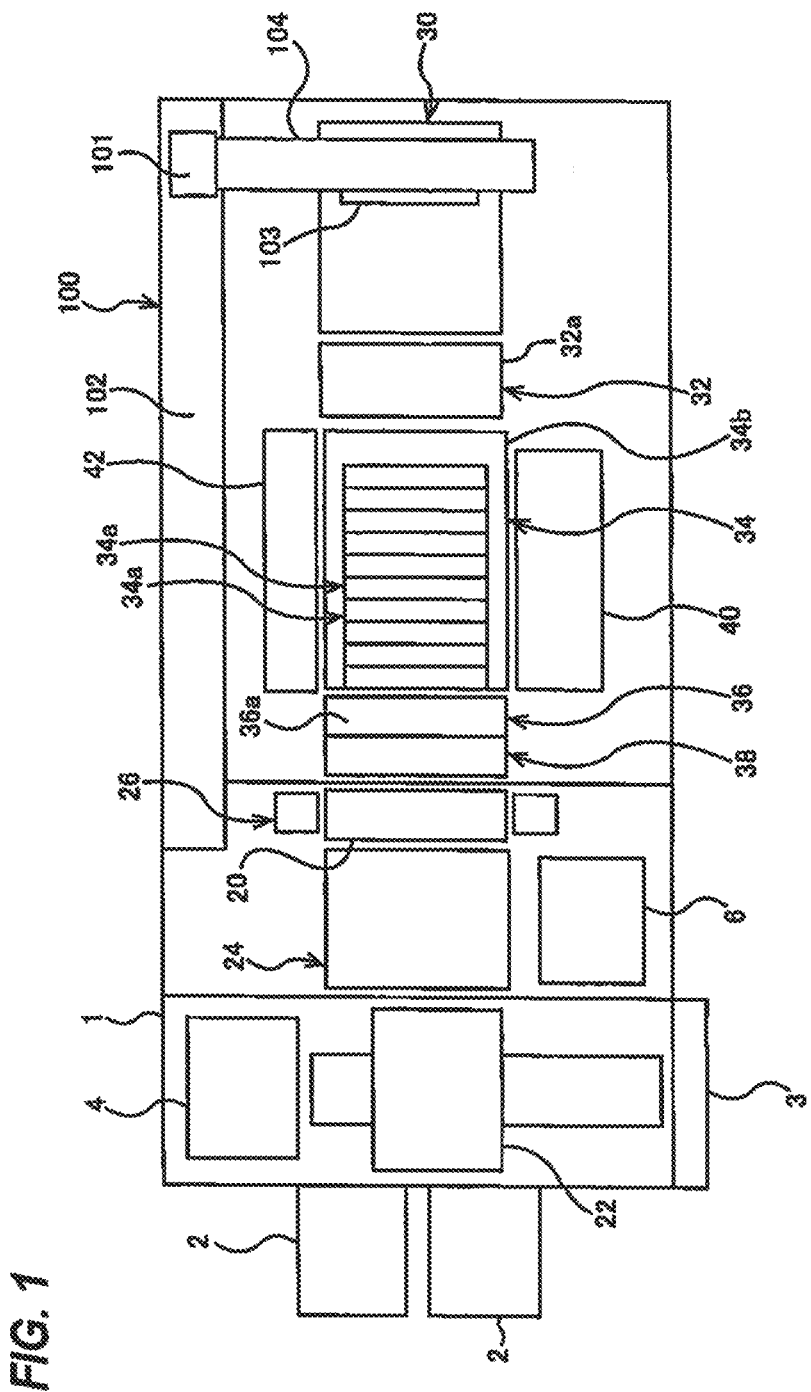
FIG. 1 is a schematic plan view of a plating apparatus according to an embodiment.
Figure 2:
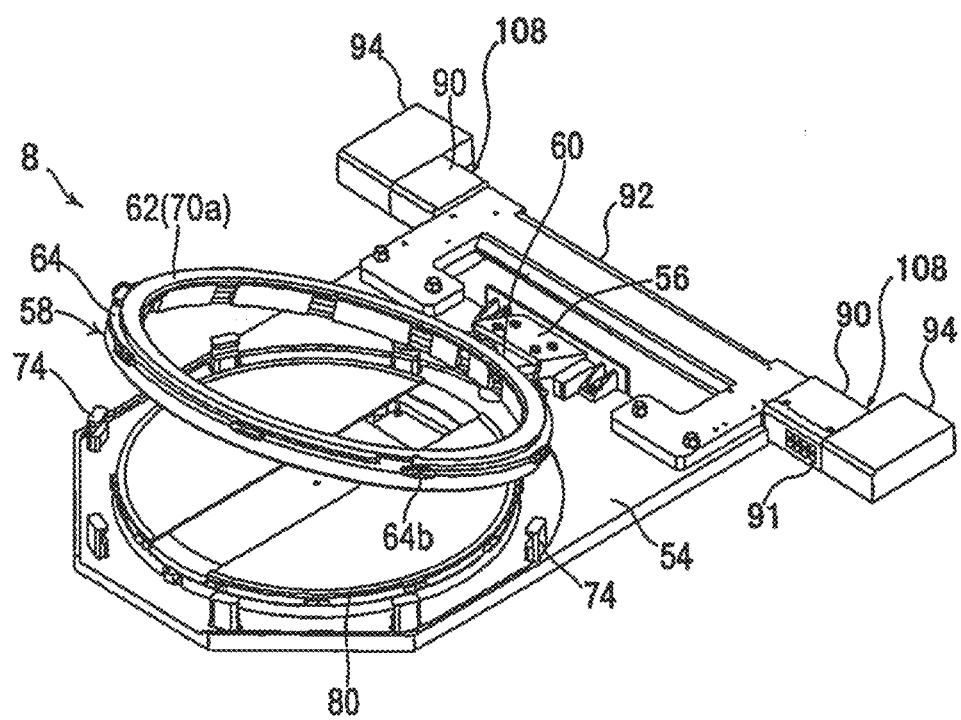
FIG. 2 is a perspective view of a substrate holder.

Embodiments will now be described in detail with reference to the drawings. Identical or corresponding elements are denoted by the same reference numerals and duplicate descriptions thereof are omitted. FIG. 1 shows an overall layout plan view of a plating apparatus according to an embodiment. As shown in FIG. 1, the plating apparatus includes a frame 1, two load ports 2 each receiving thereon a cassette in which substrates, such as wafers, are stored, and a controller 3 configured to control operations of the plating apparatus. In the frame 1, there are disposed an aligner 4 for aligning an orientation flat or a notch of a substrate with a predetermined direction, a spin-rinse drier (SRD) 6 for rotating a plated substrate at a high speed to dry the substrate, and a table 20 on which a substrate holder 8 (see FIG. 2 through FIG. 5) is placed in a horizontal position. Further, a substrate transfer robot 22 is provided for transporting the substrate between these units. The aligner 4, the spin-rinse drier (SRD) 6, the table 20, and the substrate transfer robot 22 are arranged in the frame 1.

A substrate-holder opening and closing mechanism 24 is disposed above the table 20. This substrate-holder opening and closing mechanism 24 is configured to open and close the substrate holder 8 that is placed on the table 20 to load and unload the substrate holder 8 with a substrate. A substrate-holder tilting mechanism 26, which is configured to raise the substrate holder 8 up and lay it down, is disposed beside the table 20.

In the interior of the frame 1, there are provided a storage unit 30 for storing and temporarily placing substrate holders 8 therein, a precleaning bath 32 for precleaning (pretreating) the substrate, held by the substrate holder 8, with a pretreatment liquid, such as pure water, a plating bath 34 for plating the substrate held by the substrate holder 8, a rinsing bath 36 for rinsing the plated substrate, together with the substrate holder 8, with a rinsing liquid, and a blowing bath 38 for draining the liquid off the rinsed substrate. The storage unit 30, the precleaning bath 32, the plating bath 34, the rinsing bath 36, and the blowing bath 38 are arranged in series in this order.

In this embodiment, the precleaning bath 32 has one precleaning cell 32a for holding the pretreatment liquid, such as pure water, therein. The plating bath 34 has a plurality of (e.g., 10 in this embodiment) plating cells 34a for holding a plating solution therein, and further has an overflow bath 34b. The rinsing bath 36 has one rinsing cell 36a for holding a rinsing liquid therein. The plating cells 34a are, for example, electroplating cells each provided with an anode electrode therein. The substrate holder 8, holding a substrate, is placed in each plating cell 34a when electroplating of the substrate is performed. Alternatively, the plating cells 34a may be electroless plating cells for performing electroless plating of a substrate. In this embodiment the plating bath 34 uses a single type of plating solution and is configured to allow the plating solution to overflow each plating cell 34a into the common overflow bath 34b. The storage unit 30 is configured to hold a plurality of parallel substrate holders 8 in a vertical position. The blowing bath 38 is configured to cause air to blow the substrate, held by the substrate holder 8, to remove liquid droplets from the surface of the substrate to thereby dry the substrate surface.

A paddle motor unit 40 for driving a paddle (not shown) for agitating the plating solution in each plating cell 34a is provided on one side of the plating bath 34. An exhaust duct 42 is provided on the other side of the plating bath 34.

As shown in FIGS. 2 through 5, the substrate holder 8 includes a first holding member (or a base holding member) 54 having a rectangular plate shape and made of e.g., vinyl chloride, and a second holding member (or a movable holding member) 58 rotatably coupled to the first holding member 54 through a hinge 56 which allows the second holding member 58 to open and close with respect to the first holding member 54. While the second holding member 58 is configured to be openable and closable through the hinge 56 in this embodiment, it is also possible to dispose the second holding member 58 opposite to the first holding member 54 and to move the second holding member 58 away from and toward the first holding member 54 to thereby open and close the second holding member 58.

The first holding member 54 may be made of vinyl chloride. The second holding member 58 includes a base portion 60 and a ring-shaped seal holder 62. The seal holder 62 may be made of vinyl chloride so as to enable a retaining ring 64, which will be described later, to slide well. An annular substrate-side sealing member 66 (see FIG. 4 and FIG. 5), which is projecting inwardly, is attached to an upper portion of the seal holder 62. This substrate-side sealing member 66 is placed in pressure contact with a periphery of the surface of the substrate W to seal a gap between the substrate W and the second holding member 58 when the substrate W is held by the substrate holder 8. An annular holder-side sealing member 68 (see FIG. 4 and FIG. 5) is attached to a surface, facing the first holding member 54, of the seal holder 62. This holder-side sealing member 68 is placed in pressure contact with the first holding member 54 to seal a gap between the first holding member 54 and the second holding member 58 when the substrate W is held, by the substrate holder 8. The holder-side sealing member 68 is located at the outer side of the substrate-side sealing member 66.

Figure 5:
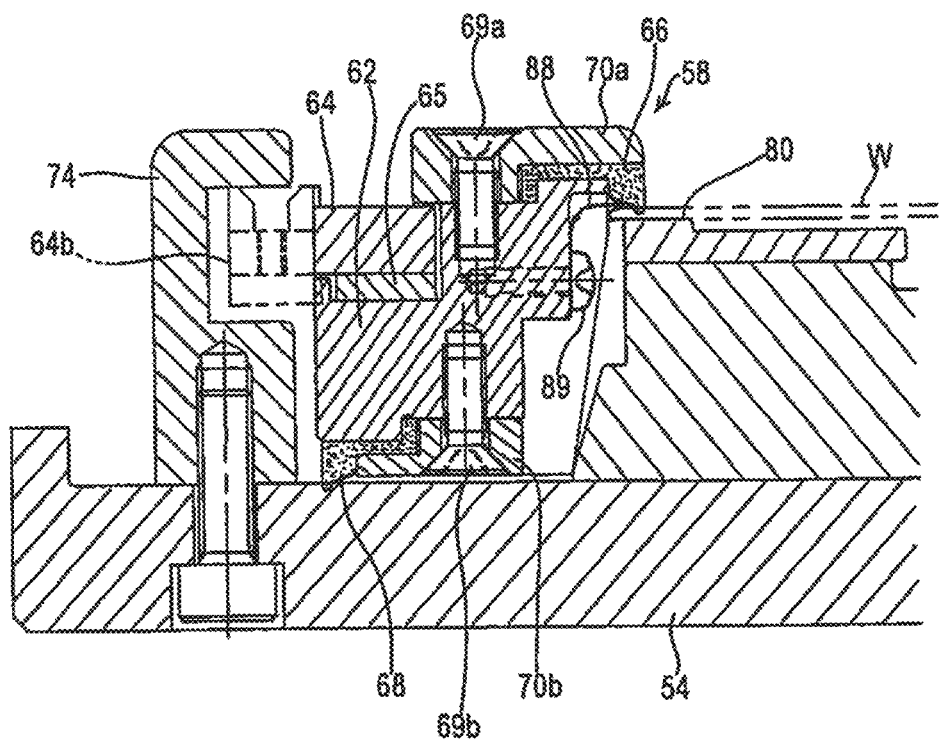
FIG. 5 is an enlarged cross-sectional view of an encircled area indicated by symbol V shown in FIG. 4.

As shown in FIG. 5, the substrate-side sealing member 66 is sandwiched between the seal holder 62 and a first mounting ring 70a, which is secured to the seal holder 62 by fastening tools 69a, such as screws. The holder-side sealing member 68 is sandwiched between the seal holder 62 and a second mounting ring 70b, which is secured to the seal holder 62 by fastening tools 69b, such as screws.

The seal holder 62 has a stepped portion at a periphery thereof, and the retaining ring 64 is rotatably mounted to the stepped portion through a spacer 65. The retaining ring 64 is inescapably held by an outer peripheral portion of the first mounting ring 70a. This retaining ring 64 is made of a material (e.g., titanium) having high rigidity and excellent acid and alkali corrosion resistance and the spacer 65 is made of a material having a low friction coefficient, for example PTFE, so that the retaining ring 64 can rotate smoothly.

Inverted L-shaped clampers 74, each having an inwardly projecting portion and located at the outer side of the retaining ring 64, are secured to the first holding member 54 at equal intervals along a circumferential direction of the retaining ring 64. The retaining ring 64 has, on its outer circumferential surface, outwardly projecting portions 64b arranged at positions corresponding to positions of the clampers 74. A lower surface of the inwardly projecting portion of each clamper 74 and an upper surface of each projecting portion 64b of the retaining ring 64 are inclined in opposite directions along the rotational direction of the retaining ring 64 to form tapered surfaces. A plurality (e.g., three) of upwardly projecting protrusions 64a are provided on the retaining ring 64 at predetermined positions along the circumferential direction of the retaining ring 64. The retaining ring 64 can be rotated by pushing and moving each protrusion 64a in a lateral direction by means of a rotating pin (not shown).

With the second holding member 58 open, the substrate W is inserted into the central portion of the first holding member 54, and the second holding member 58 is then closed through the hinge 56. Subsequently the retaining ring 64 is rotated clockwise so that each projecting portion 64b of the retaining ring 64 slides into the inwardly projecting portion of each clamper 74. As a result, the first holding member 54 and the second holding member 58 are fastened to each other and locked by engagement between the tapered surfaces of the retaining ring 64 and the tapered surfaces of the clampers 74. The lock of the second holding member 58 can be released by rotating the retaining ring 64 counterclockwise to disengage the projecting portions 64b of the retaining ring 64 from the inverted L-shaped clampers 74.

When the second holding member 58 is locked in the above-described manner, the downwardly-protruding portion of the substrate-side sealing member 66 is placed in pressure contact with the periphery of the surface of the substrate W. The substrate-side sealing member 66 is pressed uniformly against the substrate W to thereby seal the gap between the periphery of the surface of the substrate W and the second holding member 58. Similarly, when the second holding member 58 is locked, the downwardly-protruding portion of the holder-side sealing member 68 is placed in pressure contact with the surface of the first holding member 54. The sealing holder-side sealing member 68 is uniformly pressed against the first holding member 54 to thereby seal the gap between the first holding member 54 and the second holding member 58.

A pair of holder hangers 108, which project outwardly, are provided on an end portion of the first holding member 54. Each holder hander 108 is constituted by an inner hanger portion 90 and an outer hanger portion 94. A hand lever 92 extends between the inner hanger portions 90 on both sides. In the precleaning bath 32, the plating bath 34, the rinsing bath 36, and the blowing both 38, the substrate holder 8 is hung from surrounding walls of these baths through either the inner hanger portions 90 or the outer hanger portions 94.

A protruding portion 82 is formed on the upper surface of the first holding member 54 so as to protrude in a ring shape with a size corresponding to a size of the substrate W. The protruding portion 82 has an annular support surface 80 which contacts a peripheral portion of the substrate W to support the substrate W. The protruding portion 82 has recesses 84 arranged at predetermined positions along a circumferential direction of the protruding portion 82.

Figure 3:
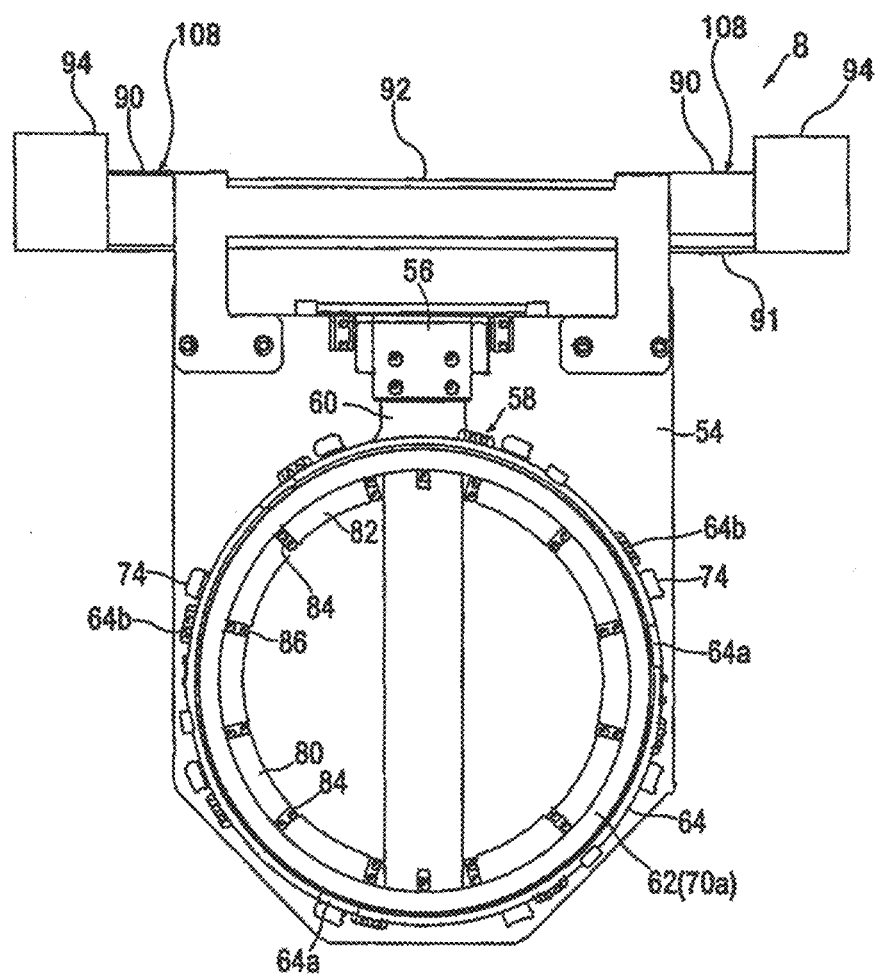
FIG. 3 is a plan view of the substrate holder shown in FIG. 2.
Figure 4:
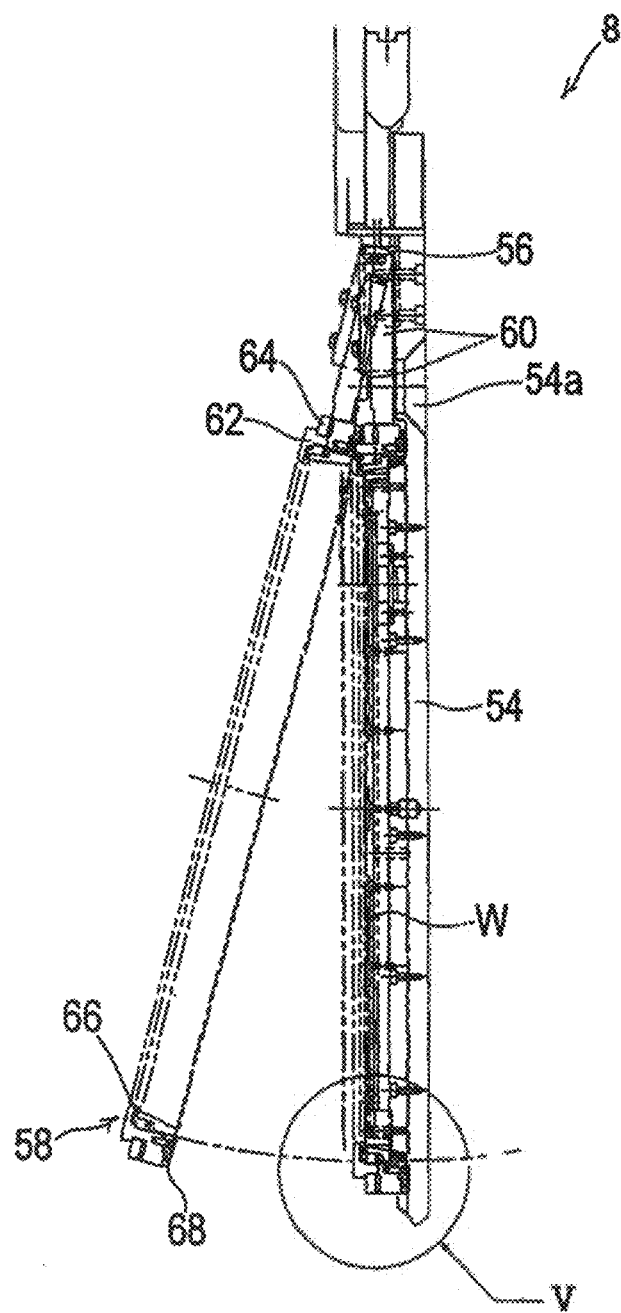
FIG. 4 is a right side view of the substrate holder shown in FIG. 2.

As shown in FIG. 3, a plurality of (e.g., 12 as illustrated) electrical conductors (electrical contacts) 86 are disposed in the recesses 84, respectively. These electrical conductors 86 are coupled respectively to wires extending from connect terminals 91 provided on the inner hanger portion 90 of the holder hanger 108. When the substrate W is placed on the support surface 80 of the first holding member 54, end portions of the electrical conductors 86 spring out around the substrate W to resiliently contact lower portions of electrical contacts 88 shown in FIG. 5.

The electrical contacts 88, which are to be electrically connected to the electrical conductors 86, are secured to the seal holder 62 of the second holding member 58 by fastening tools 89, such as screws. Each of the electrical contacts 88 has a leaf spring-like contact portion located at the outer side of the substrate-side sealing member 66 and projecting inwardly. This spring-like contact portion is springy and bends easily. When the substrate W is held by the first holding member 54 and the second holding member 58, the contact portions of the electrical contacts 88 come into elastic contact with the peripheral surface of the substrate W supported on the support surface 80 of the first holding member 54.

The second holding member 58 is opened and closed by a not-shown pneumatic cylinder and by a weight of the second holding member 58 itself. More specifically, the first holding member 54 has a through-hole 54a, and a pneumatic cylinder (not shown) is provided in the opposite position of the through-hole 54a when the substrate holder 8 is placed on the table 20. The second holding member 58 is opened by extending a piston rod of the pneumatic cylinder through the through-hole 54a to push up the seal holder 62 of the second holding member 58. The second holding member 58 is closed by its own weight when the piston rod is retracted.

Referring back to FIG. 1, a transporter 100 is provided for transporting the substrate holder 8, together with a substrate, between the storage unit 30, the precleaning bath 32, the plating bath 34, the rinsing bath 36, the blowing bath 38, and the substrate-holder tilting mechanism 26. The transporter 100 includes a stationary base 102 fixed to the frame 1 and extending horizontally, a lifter 101 configured to be able to move on the stationary base 102 in the horizontal direction, and an arm 104 coupled to the lifter 101. The arm 104 has a gripper 103 for gripping the substrate holder 8. The arm 104 and the lifter 101 are configured to move together in the horizontal direction, and the arm 104 is elevated and lowered by the lifter 101. A linear motor or rack and pinion may be used as a drive source for moving the lifter 101 and the arm 104 in the horizontal direction.

A processing operation of the plating apparatus thus constructed will be described below. First, the arm 104 of the transporter 100 removes the substrate holder 8 in a vertical position from the storage unit 30. The arm 104 that is holding the substrate holder 8 moves in the horizontal direction to the substrate-holder tilting mechanism 26, and transfers the substrate holder 8 to the substrate-holder tilting mechanism 26. The substrate-holder tilting mechanism 26, which has received the substrate holder 8, converts the substrate holder 8 from the vertical position into a horizontal position, and places the substrate holder 8 on the table 20. Then the substrate-holder opening and closing mechanism 24 opens the substrate holder 8 that is placed on the table 20.

The substrate transfer robot 22 removes a substrate from the cassette on one of the load ports 2, and places the substrate on the aligner 4. The aligner 4 aligns an orientation flat or a notch of the substrate with a predetermined direction. The substrate transfer robot 22 then removes the substrate from the aligner 4, and inserts the substrate into the substrate holder 8 placed on the table 20. The substrate holder opening and closing mechanism 24 then closes the substrate holder 8 and locks the substrate holder 8.

Subsequently, the substrate-holder tilting mechanism 26 converts the substrate holder 8 from the horizontal position into the vertical position. The gripper 103 of the arm 104 grips the substrate holder 8 in the vertical position, and the arm 104 moves the substrate holder 8 in the horizontal direction to a position above the precleaning bath 32. The lifter 101 of the transporter 100 lowers the arm 104 together with the substrate holder 8, and sets the substrate holder 8 in a predetermined position in the precleaning bath 32. The substrate is then precleaned by the precleaning bath 32. After the precleaning of the substrate is terminated, the gripper 103 of the arm 104 grips the substrate holder 8 in the precleaning bath 32. The lifter 101 elevates the arm 104 to thereby pull up the substrate holder 8 out of the precleaning bath 32.

The arm 104 moves the substrate holder 8 in the horizontal direction to a position above the plating bath 34. The lifter 101 of the transporter 100 then lowers the arm 104 together with the substrate holder 8, and sets the substrate holder 8 in a predetermined position in one of the plating cells 34a of the plating bath 34. The substrate that is held by the substrate holder 8 is plated in the plating cell 34a. After the plating of the substrate is terminated, the gripper 103 of the arm 104 grips the substrate holder 8 in the plating cell 34a. The lifter 101 elevates the arm 104 to thereby pull up the substrate holder 8 out of the plating bath 34.

The arm 104 moves the substrate holder 8 in the horizontal direction to a position above the rinsing bath 36. The lifter 101 of the transporter 100 then lowers the arm 104 together with the substrate holder 8, and sets the substrate holder 8 in a predetermined position in the rinsing bath 36. The plated substrate that is held by the substrate holder 8 is rinsed in the rinsing bath 36. After the rinsing of the substrate is terminated, the gripper 103 of the arm 104 grips the substrate holder 8 in the rinsing bath 36. The lifter 101 elevates the arm 104 to thereby pull up the substrate holder 8 out of the rinsing bath 36.

The arm 104 moves the substrate holder 8 in the horizontal direction to a position above the blowing bath 38. The lifter 101 of the transporter 100 then lowers the arm 104 together with the substrate holder 8, and sets the substrate holder 8 in a predetermined position in the blowing bath 38. The blowing bath 38 ejects air that blows the substrate to remove liquid droplets from the surface of the substrate held by the substrate holder 8, thereby drying the substrate. After the blowing process in the blowing bath 38 is terminated, the gripper 103 of the arm 104 grips the substrate holder 8 in the blowing bath 38. The lifter 101 elevates the arm 104 to thereby pull up the substrate holder 8 out of the blowing bath 38.

The arm 104 moves in the horizontal direction to the substrate-holder tilting mechanism 26, and transfers the substrate holder 8 to the substrate-holder tilting mechanism 26. The substrate-holder tilting mechanism 26 places the substrate holder 8 in the horizontal position on the table 20. Then, the substrate-holder opening and closing mechanism 24 opens the substrate holder 8. The substrate transfer robot 22 removes the processed substrate from the substrate holder 8, and carries the substrate to the spin-rinse drier 6. The spin-rinse drier 6 rotates the substrate at a high speed to thereby dry the substrate. Then, the substrate transfer robot 22 takes the dried substrate out of the spin-rinse drier 6, and returns the substrate back into the cassette on the load port 2. The processing of one substrate is now completed.

Figure 6:
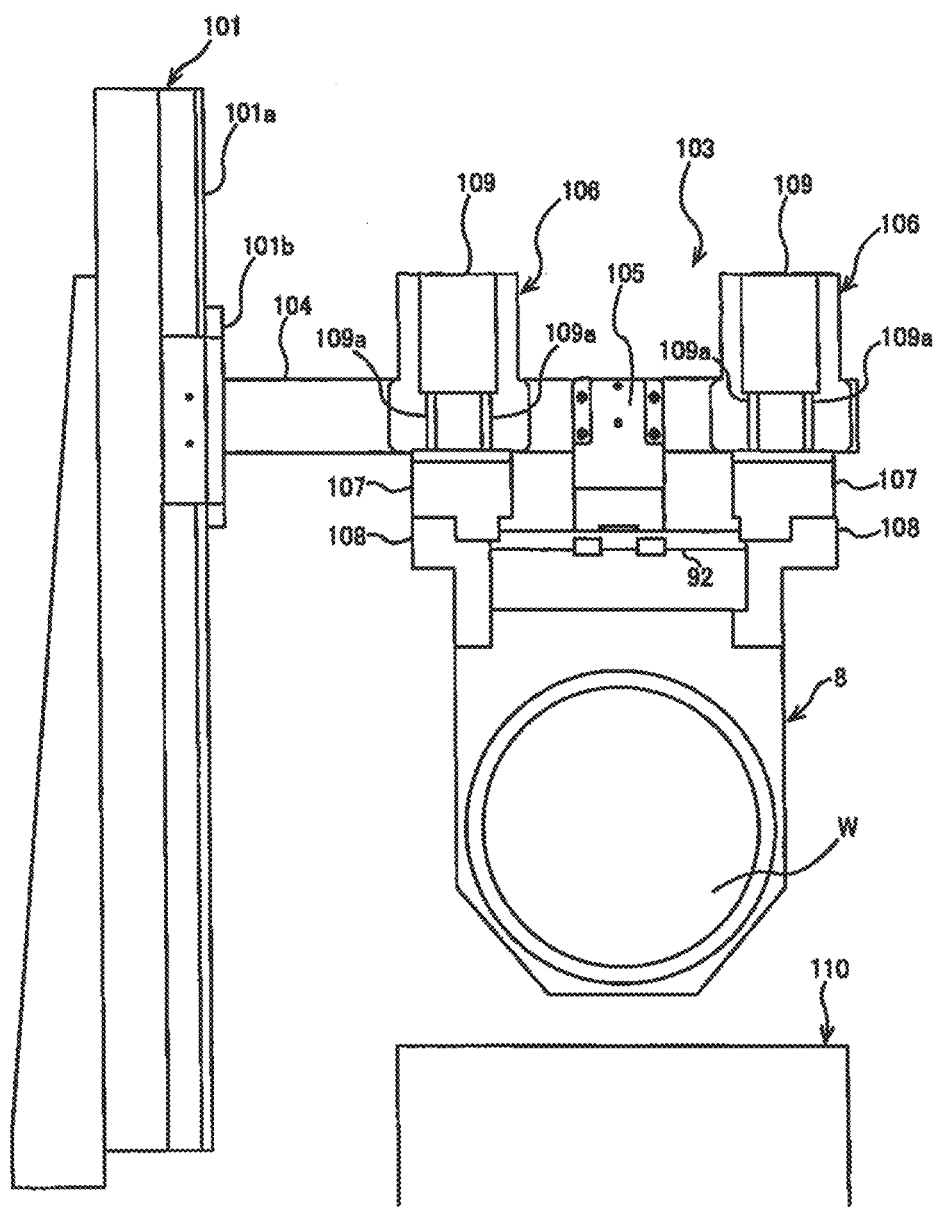
FIG. 6 is a front view of a part of the plating apparatus.

FIG. 6 shows a front view of a part of the plating apparatus. As shown in FIG. 6, the arm 104 is located above a processing bath 110 storing a processing liquid therein. The processing bath 110 refers to either one of the precleaning bath 32, the plating bath 34, and the rinsing bath 36. In other words, the precleaning bath 32, the plating bath 34, and the rinsing bath 36 are collectively referred to as the processing bath 110. The arm 104 has the gripper 103 that serves to grip the substrate holder 8. This gripper 103 has a hook 105 for supporting the substrate holder 8 and two pressing mechanisms 106 for pressing the holder hangers 108 downwardly. The hook 105 is shaped so as to hang the hand lever 92 of the substrate holder 8.

Each of the pressing mechanisms 106 has a pressing member 107 which is brought into contact with an upper surface of the holder hanger 108 and a pneumatic cylinder 109 for moving the pressing member 107 downwardly. When the pneumatic cylinder 109 is actuated to lower piston rods 109a thereof, the pressing member 107, coupled to the piston rods 109a, is lowered to press the holder hanger 108 downwardly. The pressing member 107 presses the holder hanger 108 downwardly with the hand lever 92 hung on the hook 105, so that the substrate holder 8 is gripped by the gripper 103. The substrate holder 8 that is gripped by the gripper 103 can be transported in the vertical direction and the horizontal direction stably by the transporter 100 without swinging or wobbling.

Figure 7:
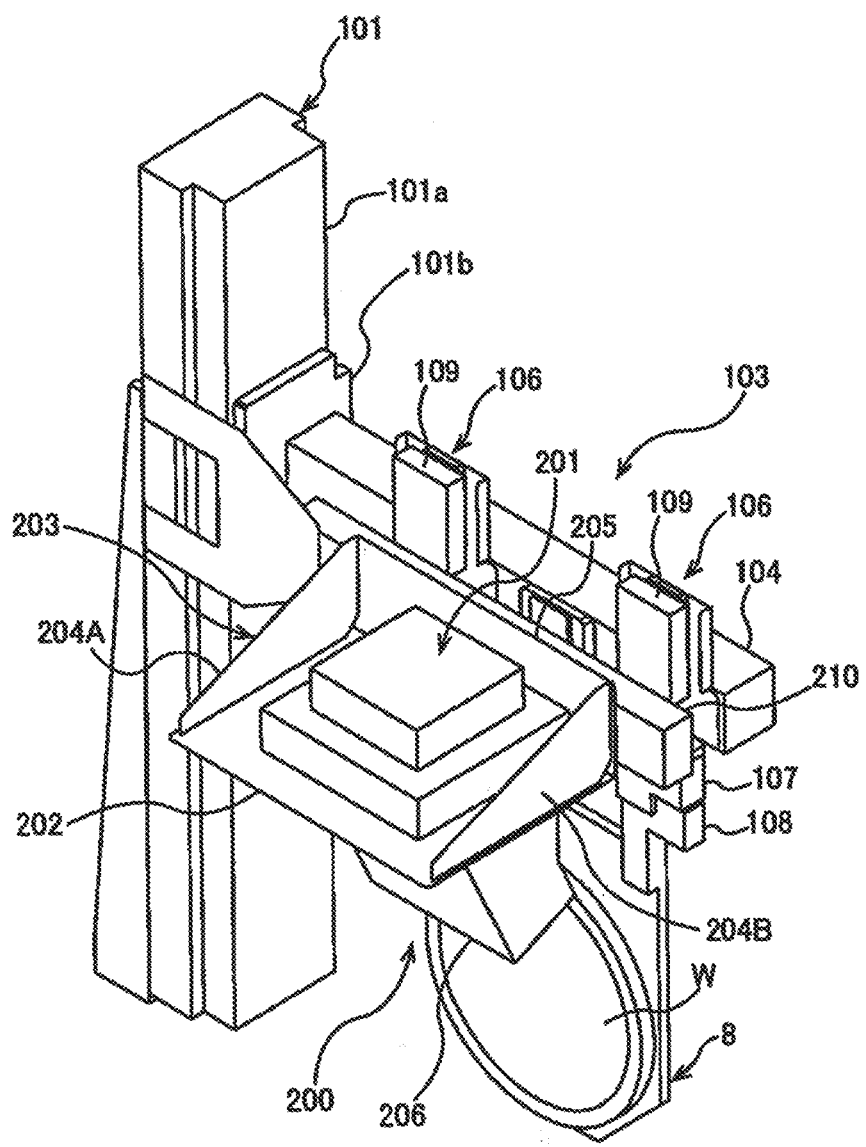
FIG. 7 is a perspective view of the plating apparatus shown in FIG. 6.
Figure 8:
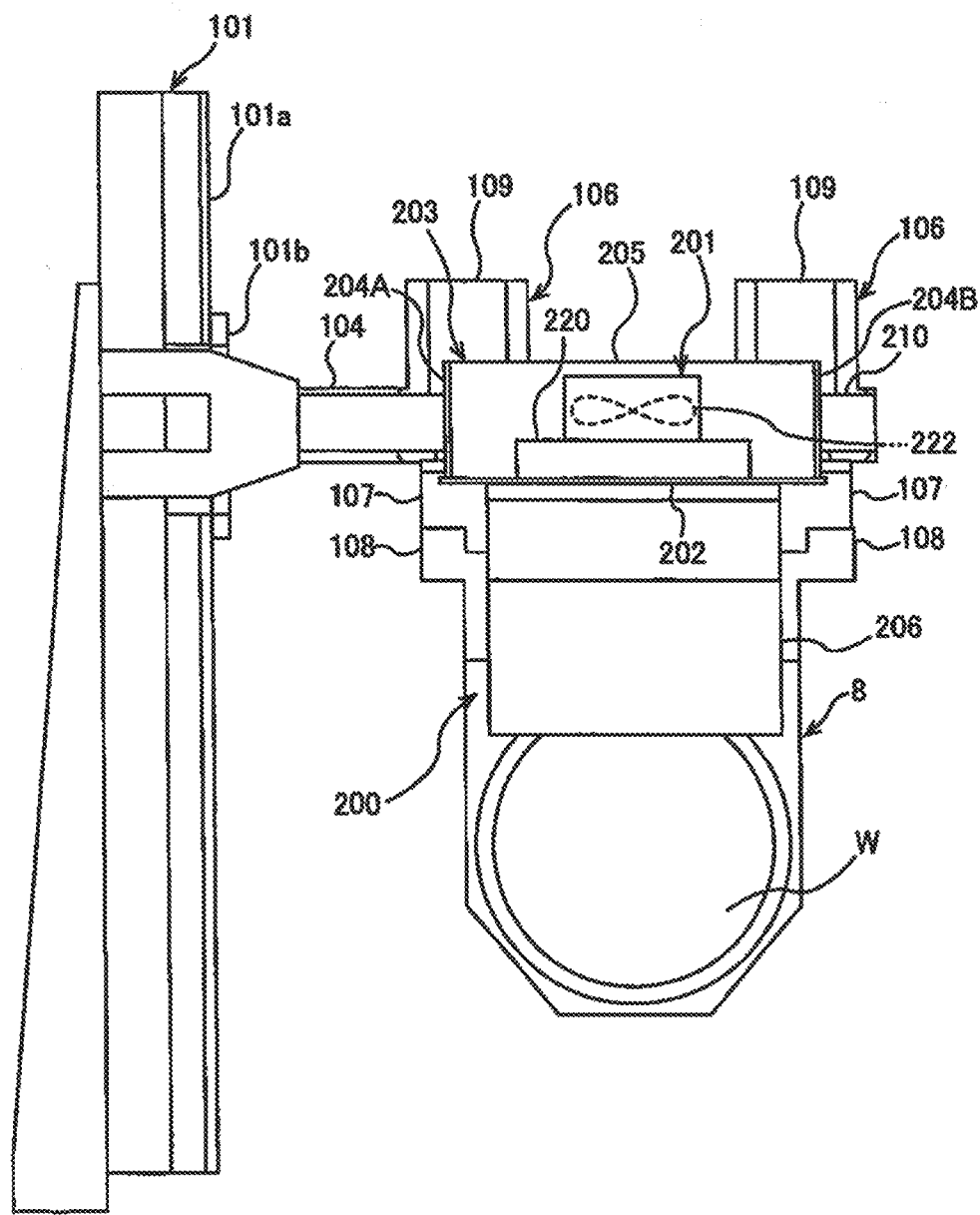
FIG. 8 is a front view of the plating apparatus shown in FIG. 7.
Figure 9:
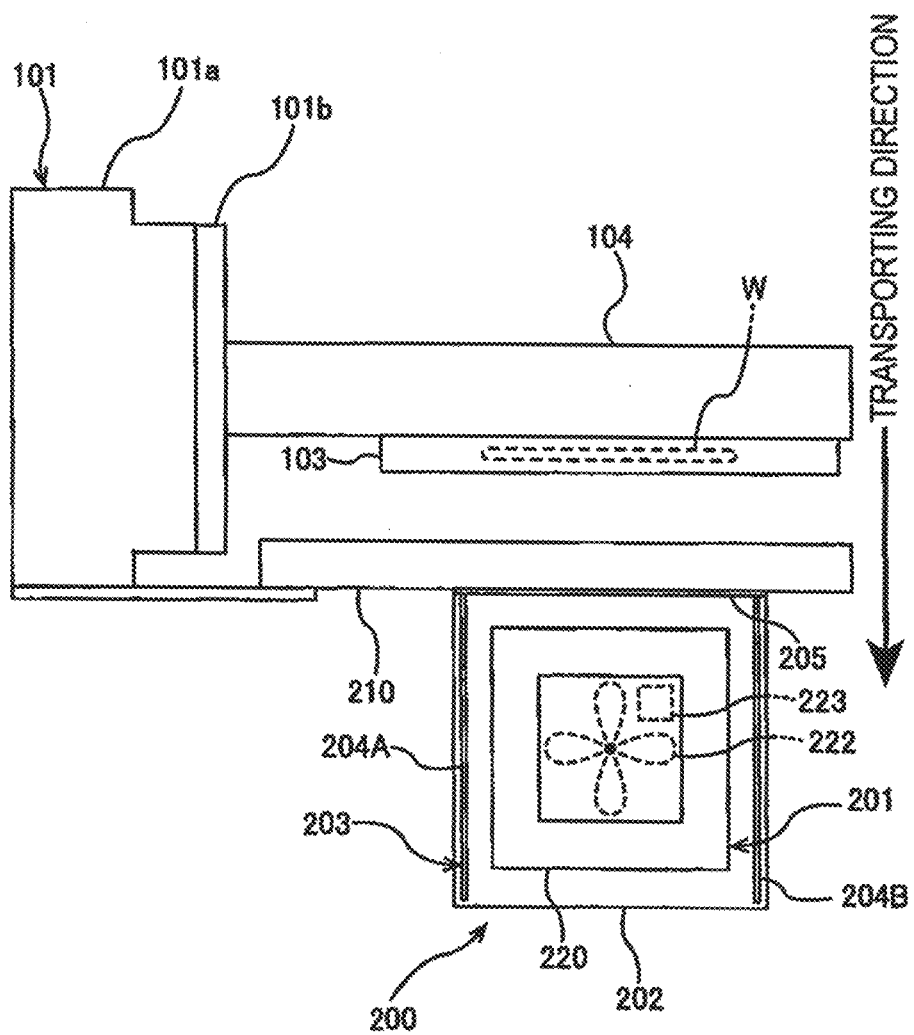
FIG. 9 is a plan view of the plating apparatus shown in FIG. 7.

FIG. 7 shows a perspective view of the plating apparatus shown in FIG. 6. FIG. 8 shows a front view of the plating apparatus shown in FIG. 7. FIG. 9 shows a plan view of the plating apparatus shown in FIG. 7. The plating apparatus according to the present embodiment has a gas flow generator 200, which incorporates a fan filter unit (FFU) 201 having an air filter 220, such as a HEPA filter, a ULPA filter, or the like. The HEPA filter is an air filter having a particle collection efficiency of 99.97% or higher for particles having a diameter of 0.3 µm. The ULPA filter is an air filter having a particle collection efficiency of 99.9995% or higher for particles having a diameter of 0.15 µm. The ULPA filter thus has a higher particle collection efficiency than the HEPA filter. The fan filter unit 201 has the air filter 220 and a fan 222 disposed above the air filter 220. The fan 222 is coupled to an electric motor which is not shown. When the electric motor is energized, the fan 222 is rotated to introduce air into the fan filter unit 201. As the air passes through the air filter 220, impurities, such as particles, are removed from the air, which is then discharged downwardly as a clean gas flow from the fan filter unit 201.

The fan filter unit 201 is mounted to a mount base 202 and surrounded by a surrounding wall 203 which is constituted by side walls 204a, 204B and a rear wall 205. A hood 206, which is disposed below the fan filter unit 201, is removably attached to a lower surface of the mount base 202. The hood 206 has a lower open end so that the clean air or gas from the fan filter unit 201 passes therethrough. The fan filter unit 201, the mount base 202, the surrounding wall 203, and the book 206 jointly constitute the gas flow generator 200. The lower open end of the hood 206 has a width equal to or slightly larger than a width, i.e., a diameter, of a substrate W so that the gas flow from the fan filter unit 201 travels uniformly on the surface of the substrate W.

The lifter 101 includes a base element 101a which extends vertically and a vertically-movable element 101b which is vertically movable relative to the base element 101a. As shown in FIG. 9, the gas flow generator 200 is supported by a support member 210, which is fixed to the base element 101a of the lifter 101. Therefore, the support member 210 and the gas flow generator 200 are fixed in their vertical positions. The arm 104 is fixed to the vertically-movable element 101b, so that the arm 104 is elevated and lowered by the lifter 101. The support member 210 extends parallel to the arm 104. The support member 210 is located forward of the arm 104 with respect to the direction in which the substrate holder 8 is transported by the arm 104, i.e., the transporter 100. Hereinafter, this direction will be referred to as "the transporting direction of the substrate holder 8".

The substrate holder 8 that is holding the substrate W is gripped by the gripper 103 of the arm 104. The gas flow generator 200 is located forward of the substrate W with respect to the transporting direction of the substrate holder 8. Therefore, when the substrate holder 8 is being transported in the horizontal direction by the transporter 100, the gas flow generator 200 can generate or form the clean gas flow in front of the substrate W held by the substrate holder 8.

The gas flow generator 200 is mounted to the base element 101a of the transporter 100 through the support member 210. The gripper 103 for gripping the substrate holder 8 is coupled to the vertically-movable element 101b through the arm 104. Therefore, the gas flow generator 200 is moved in the horizontal direction together with the substrate holder 8 by the transporter 100, but is not moved in the vertical direction together with the substrate holder 8 and the substrate W.

Figure 10:
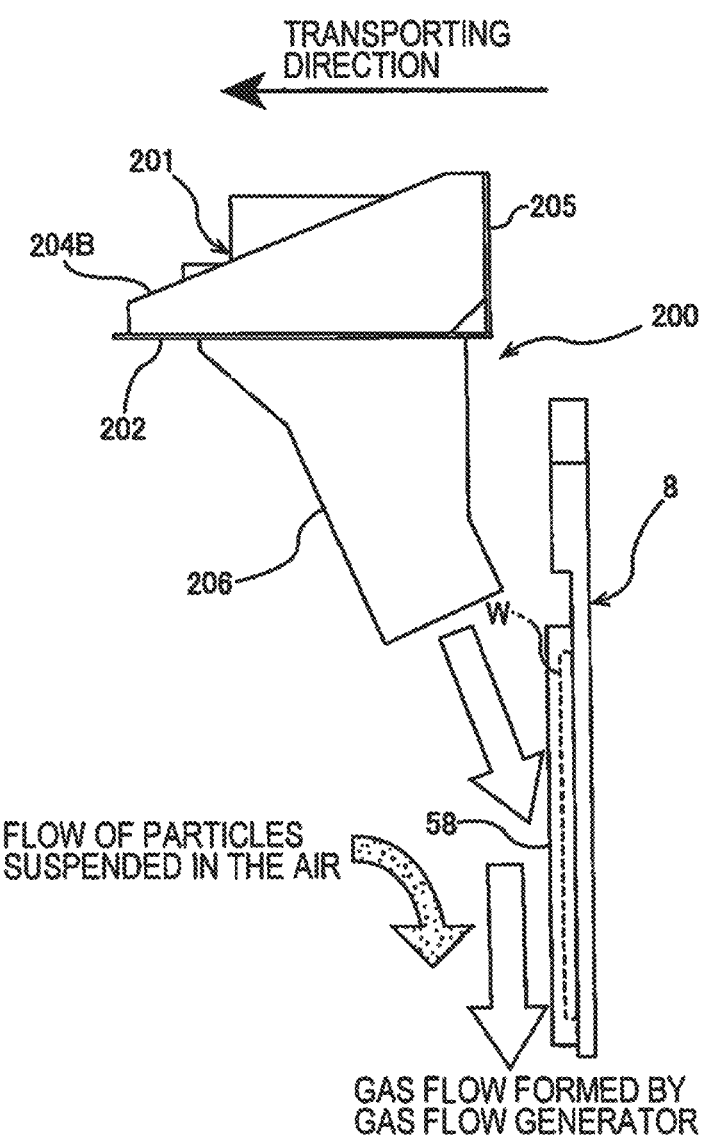
FIG. 10 is a view showing a positional relationship between a substrate holder and a gas flow generator when they are transported by a transporter.

FIG. 10 shows a positional relationship between the substrate holder 8 and the gas flow generator 200 when they are transported by the transporter 100. In FIG. 10, horizontal arrow represents the direction in which the gas flow generator 200 and the substrate holder 8 are transported, solid-white arrows represent the gas flow generated by the gas flow generator 200, and curved arrow represents flow of particles suspended in the air. As shown in FIG. 10, the gas flow generator 200 is located forward of the substrate W held by the substrate holder 8 with respect to the transporting direction of the substrate holder 8. The hood 206 has a lower portion inclined downwardly toward the substrate W held by the substrate holder 8 that is in the vertical position. Therefore, the air supplied from the fan filter unit 201 contacts the surface of the substrate W held by the substrate holder 8 and then flows downwardly parallel to the surface of the substrate W. In this manner, the clean gas flow is formed in front of the substrate W with respect to the transporting direction of the substrate holder 8, and hence the surface of the substrate W in its entirety is covered with the clean gas flow during transporting of the substrate W.

Since particles, suspended in the air, are forced to flow downwardly by the clean gas flow before the particles reach the substrate W, the particles are not attached to the surface of the substrate W. Stated otherwise, the dean gas flow formed in front of the substrate W can prevent the particles from contacting the surface of the substrate W. As a result, the substrate W is not contaminated by those particles and the processing liquid in the processing bath 110 is not contaminated either.

Figure 11:
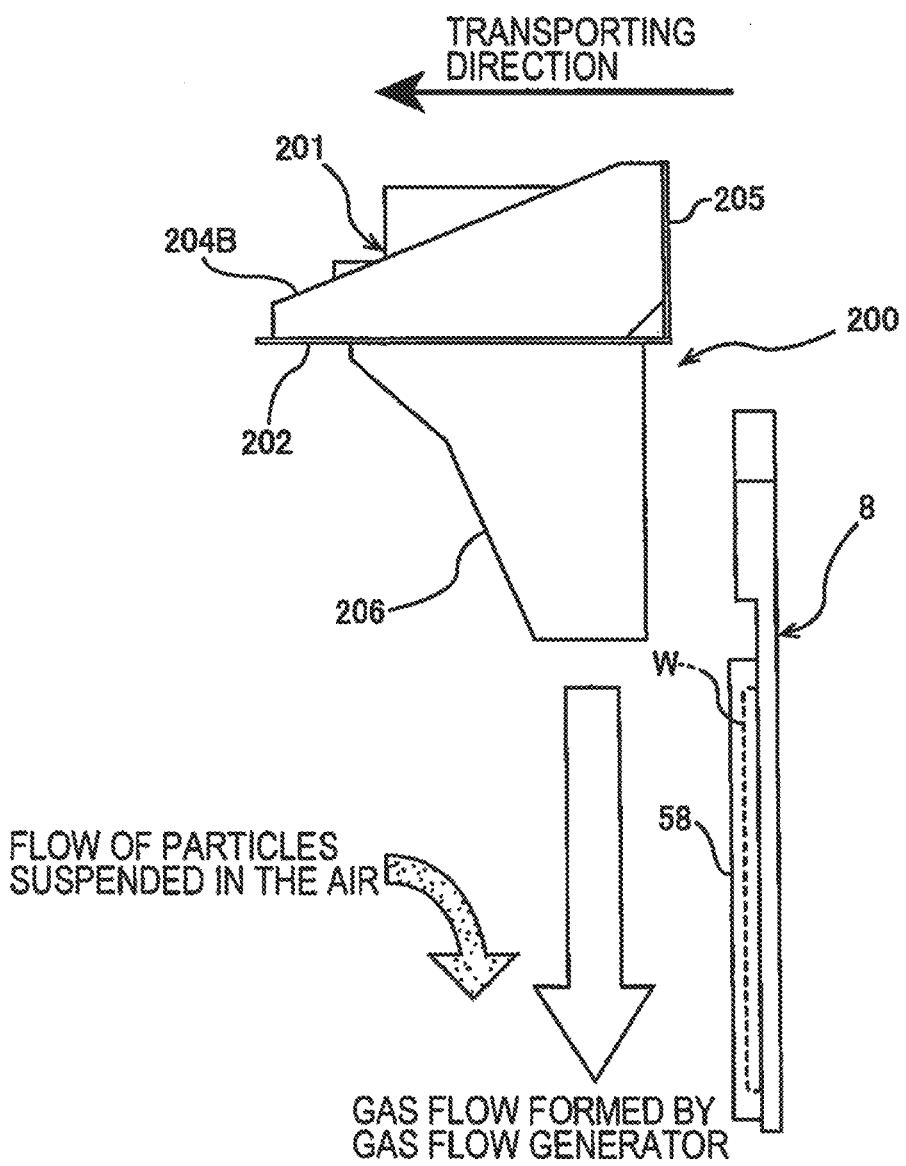
FIG. 11 is a view showing a modification of a hood.

FIG. 11 shows a modification of the hood 206. As shown in FIG. 11, the hood 206 may extend in the vertical direction in parallel to the surface of the substrate W held by the substrate holder 8. In this modification example, the clean gas supplied from the fan filter unit 201 flows downwardly parallel to the surface of the substrate W without directly contacting the surface of the substrate W. Since the hood 206 is removably mounted to the lower surface of the mount base 202, the hood 206 shown in FIG. 10 and the hood 206 shown in FIG. 11 can be exchanged from one to another.

Figure 12:
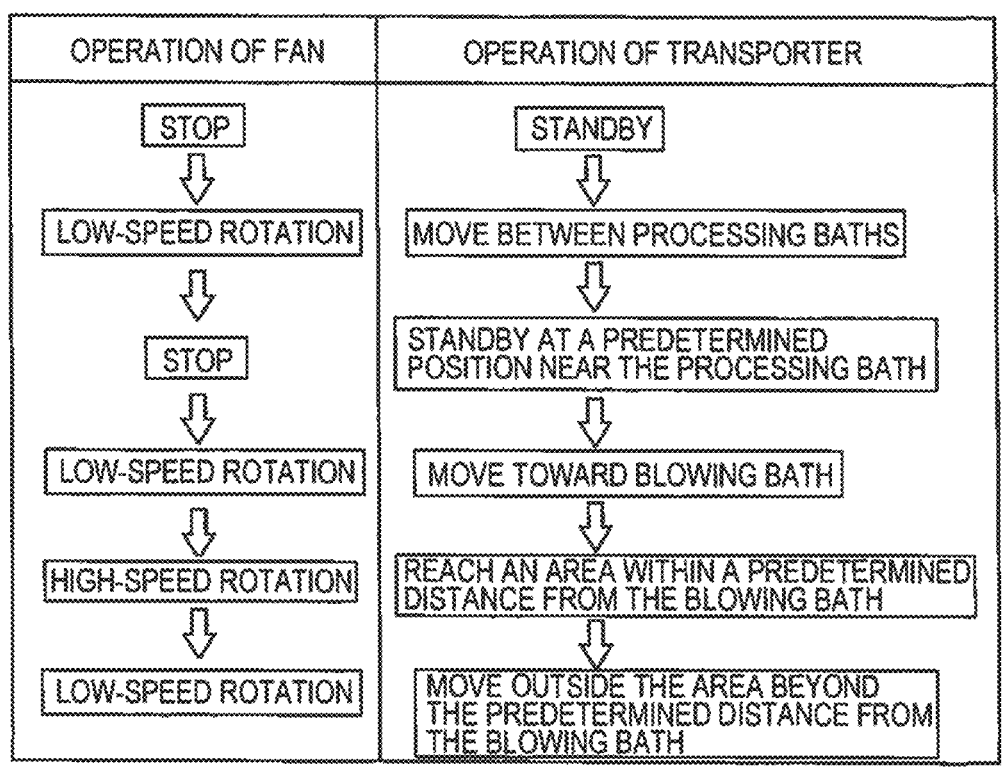
FIG. 12 is a diagram showing an operation sequence of a fan of a fan filter unit.

FIG. 12 shows an operation sequence of the fan 222 of the fan filter unit 201. The blowing bath 38 is configured to eject air that blows the substrate W held by the substrate holder 8 to thereby remove the liquid droplets from the surface of the substrate W. Therefore, the air may scatter the particles into the ambient air. Consequently, the atmosphere around the blowing bath 38 is a particularly contaminated space in the plating apparatus. Therefore, it is necessary to reliably prevent the contamination of the substrate W when the substrate holder 8 and the substrate W pass over the blowing bath 38. Thus, in order to produce a stronger gas flow, the fan filter unit 201 has a flow-rate regulator 223 (see FIG. 9) for changing a rotational speed of the fan 222, i.e., a flow rate of the air or gas delivered by the fan 222.

In FIG. 12, a left column shows the operations of the fan 222 of the fan filter unit 201, and a right column shows the operations of the transporter 100. When the transporter 100 is on standby, the fan 222 does not rotate. When the transporter 100 is transporting the substrate W and the substrate holder 8 in the horizontal direction, i.e., when the substrate W and the substrate holder 8 are moving between the processing baths 110, the fan 222 is controlled to rotate at a low speed by the flow-rate regulator 223. Since the clean gas flow is generated forward of the substrate W with respect to the transporting direction of the substrate holder 8, the particles suspended in the air are prevented from being attached to the surface of the substrate W.

The transporter 100 transports the substrate W and the substrate holder 8 to a predetermined position above the processing bath 10, and then immerses the substrate W, together with the substrate holder 8, in the processing liquid held in the processing bath 110. While the substrate W is immersed in the processing liquid, the transporter 100 stays on standby in a predetermined standby position near the processing bath 110 or transports another substrate W and another substrate holder 8 that are different from the substrate W and the substrate holder 8 that are being immersed in the processing liquid. If the transporter 100 is on standby in the standby position, the fan 222 is controlled to stop rotating. After the processing of the substrate W is terminated, the transporter 100 raises the substrate W and the substrate holder 8 out of the processing bath 110 and transports them to the blowing bath 38. When the transporter 100 is transporting the substrate W and the substrate holder 8 outside of an area which is located within a predetermined distance from the blowing bath 38, the fan 222 rotates at a low speed.

When the substrate W and the substrate holder 8 enter the area that lies within the predetermined distance from the blowing bath 38, the flow-rate regulator 223 changes the rotational speed of the fan 222 from the low speed to a high speed. The fan 222 is started to rotate at the high speed. As a result, a flow velocity and the flow rate of the clean gas increase. Because the atmosphere around the blowing bath 38 is a particularly contaminated area in the plating apparatus as described above, the fan 222 is rotated at the high speed to form a strong downward flow above the blowing bath 38 to thereby reliably prevent the particles, suspended in the surrounding atmosphere, from being attached to the substrate W. After the surface of the substrate W is dried in the blowing bath 38, the transporter 100 removes the substrate W and the substrate holder 8 from the blowing bath 38. After the substrate W and the substrate holder 8 are lifted from the blowing bath 38, the substrate holder 8 that is holding the substrate W is transported toward the table 20. As long as the substrate W and the substrate holder 8 exist within the predetermined distance from the blowing bath 38 while they are being transported, the fan 222 is rotated at the high speed. When the substrate W and the substrate holder 8 are moved away from the blowing bath 38 beyond the predetermined distance from the blowing bath 38, the fan 222 is controlled to rotate at the low speed by the flow-rate regulator 223, i.e., the flow-rate regulator 223 changes the rotational speed of the fan 222 from the high speed to the low speed.

As described above, while the substrate W and the substrate holder 8 are moving toward the blowing bath 38 and away from the blowing bath 38, the fan 222 rotates at the high speed. The fan filter unit 201 produces a stronger gas flow than usual, and can therefore reliably prevent the contamination of the substrate W.

Figure 13:
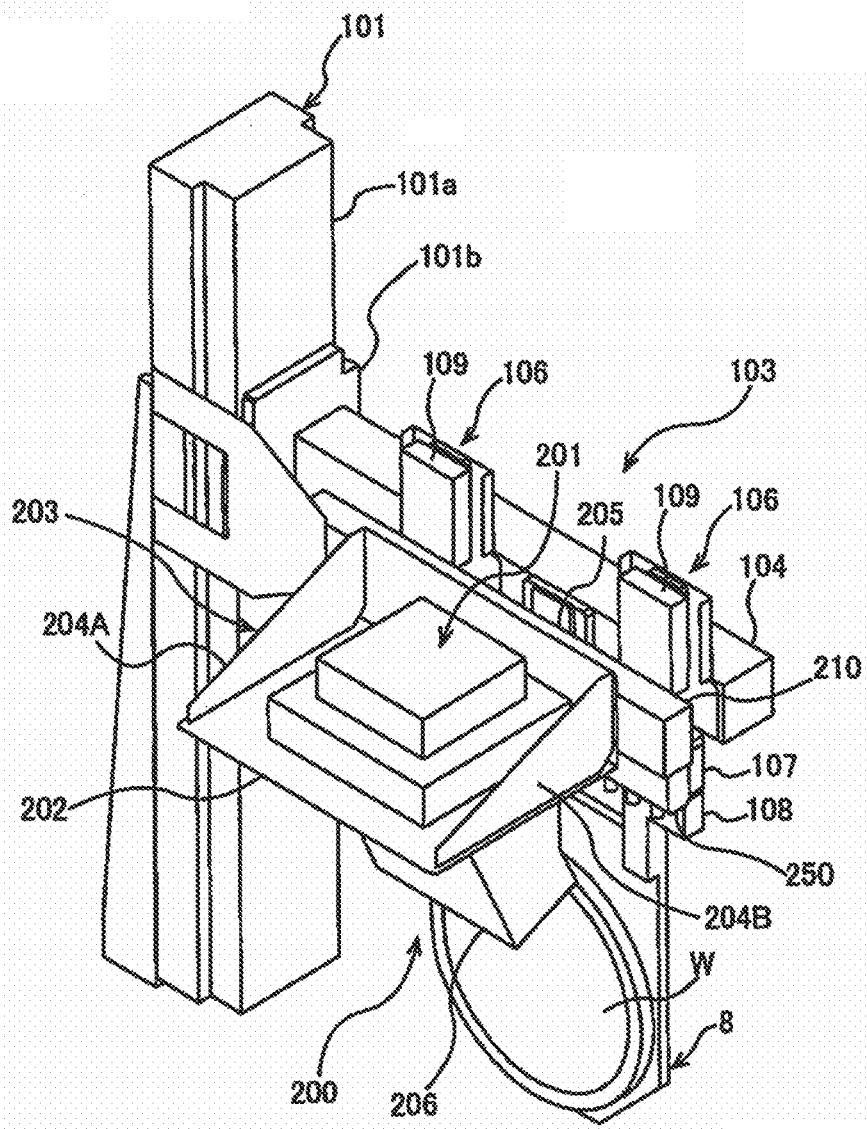
FIG. 13 is a perspective view of a part of the plating apparatus having the gas flow generator and a static electricity eliminator.
Figure 14:
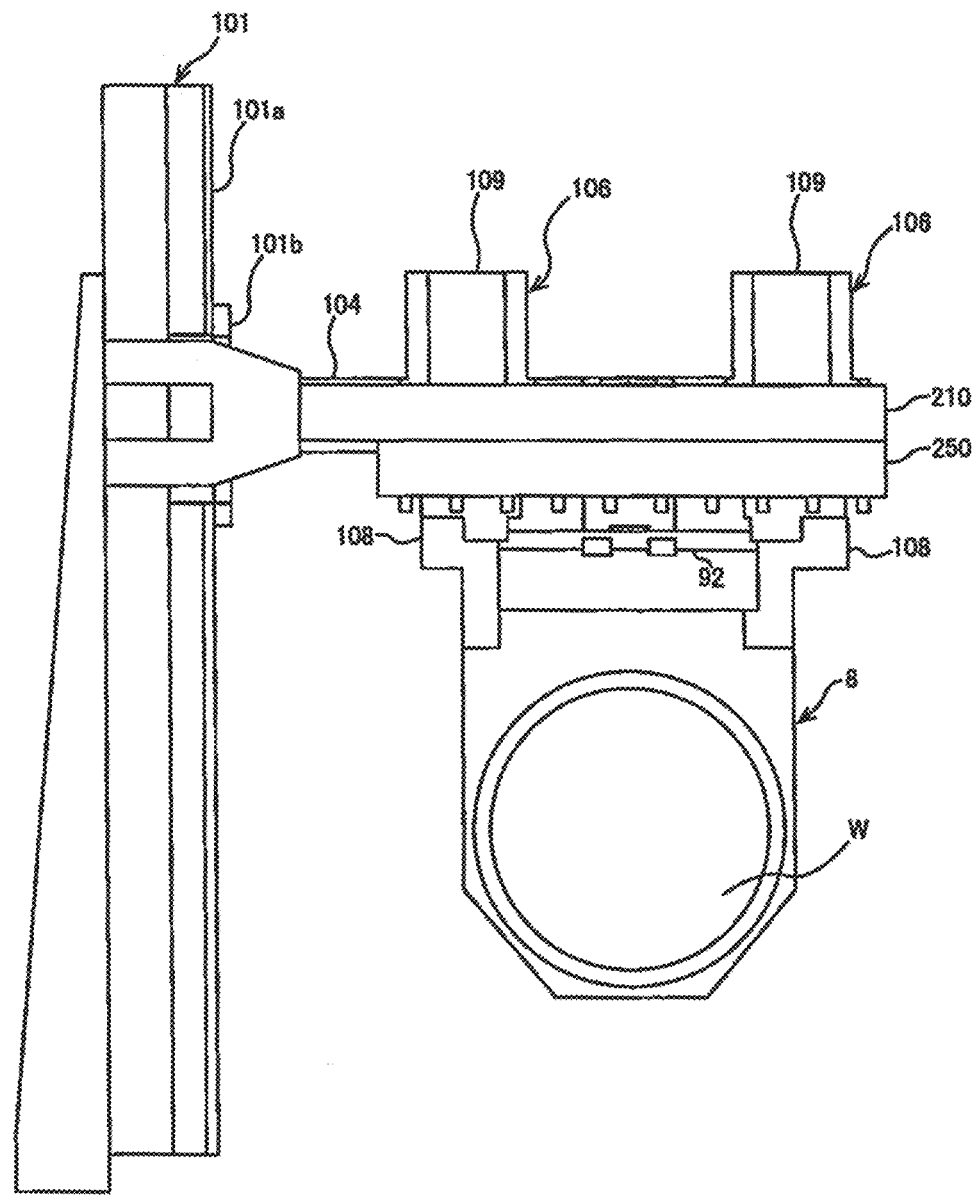
FIG. 14 is a front view of the plating apparatus shown in FIG. 13.

FIG. 13 shows a perspective view showing a part of the plating apparatus having the gas flow generator 200 and a static electricity eliminator (or an ionizer) 250. FIG. 14 shows a front view of the plating apparatus shown in FIG. 13. In FIG. 14, the gas flow generator 200 is omitted from illustration. The static electricity eliminator 250 is a device for eliminating a static electricity from the substrate W and the substrate holder 8. As shown in FIGS. 13 and 14, the static electricity eliminator 250 is mounted to the lower surface of the support member 210. The static electricity eliminator 250 is moved in the horizontal direction together with the substrate holder 8 by the transporter 100, but is not movable in the vertical direction together with the substrate holder 8 and the substrate W. The combination of the gas flow generator 200 and the static electricity eliminator 250 can more effectively prevent the particles from being attached to the surface of the substrate W.

Figure 15:
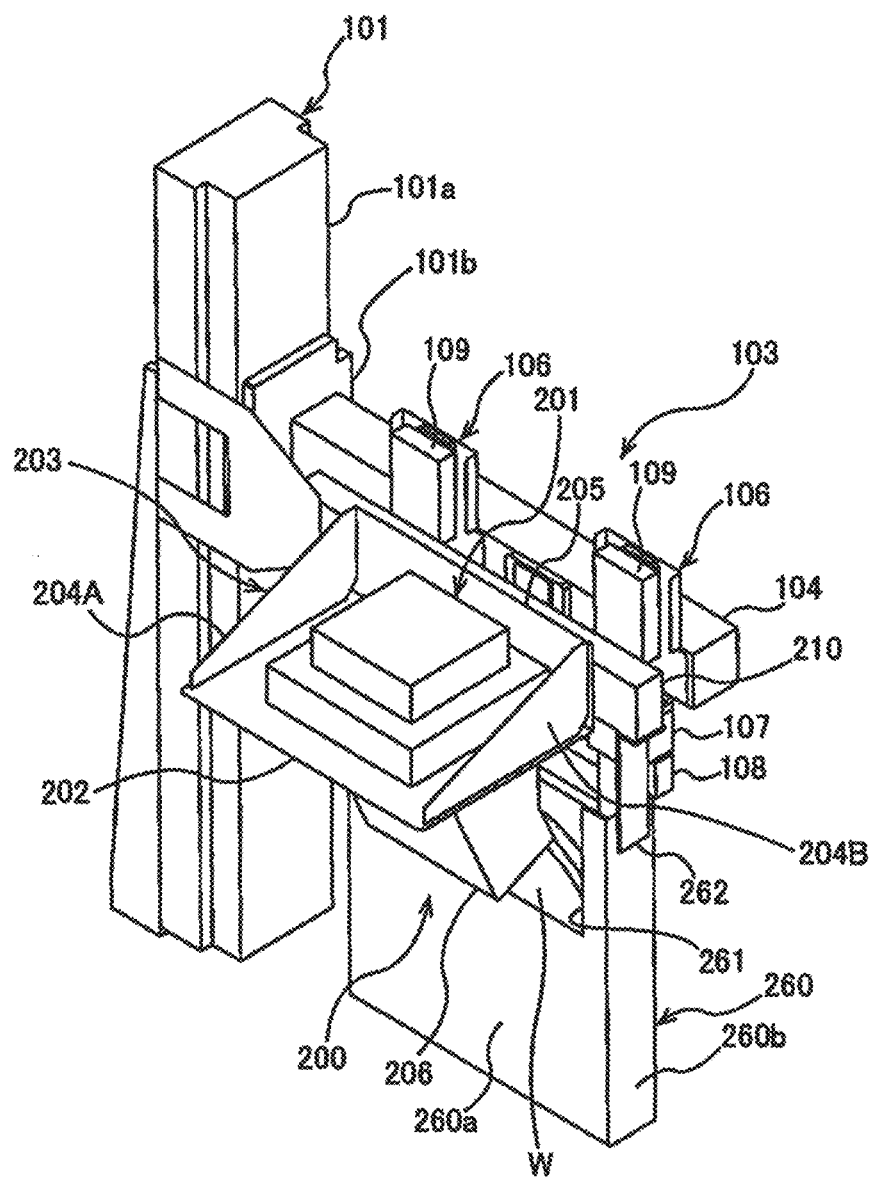
FIG. 15 is a perspective view of a part of the plating apparatus having the gas flow generator and a cover member.
Figure 16A:
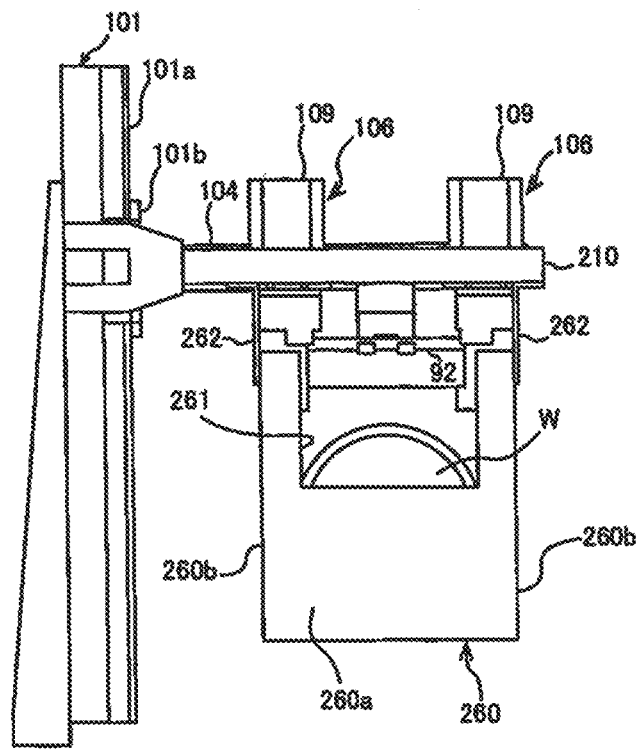
FIG. 16A is a front view of a part of the plating apparatus shown in FIG. 15 with the gas flow generator omitted from illustration.
Figure 16B:
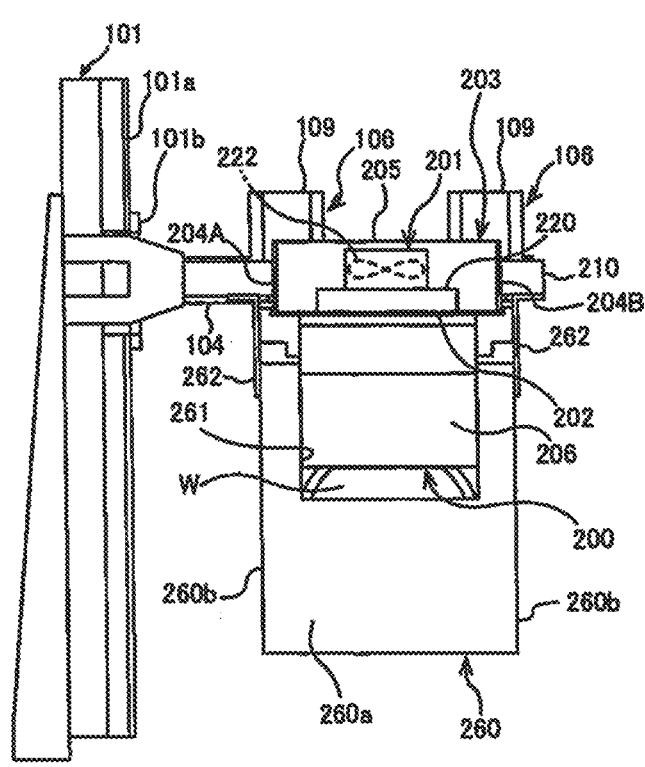
FIG. 16B is a front view of a part of the plating apparatus shown in FIG. 15 having the gas flow generator.
Figure 17:
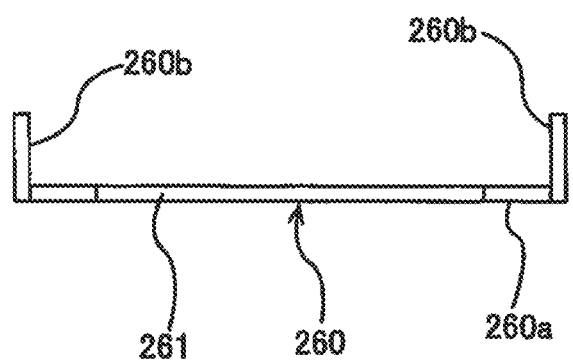
FIG. 17 is a plan view of the cover member.

FIG. 15 shows a perspective view of a part of the plating apparatus having the gas flow generator 200 and a cover member 260. FIG. 16A shows a front view of a part of the plating apparatus shown in FIG. 15 with the gas flow generator 200 omitted from illustration, and FIG. 16B shows a front view of a part of the plating apparatus shown in FIG. 15 having the gas flow generator 200. FIG. 17 shows a plan view of the cover member 260. As shown in FIGS. 15, 16A, and 16B, the plating apparatus includes the cover member 260 which is shaped so as to cover the substrate W held by the substrate holder 8 for preventing the particles, suspended in the air, from being attached to the surface of the substrate W.

The cover member 260 has a front wall 260a and two side walls 260b. More specifically, as shown in FIG. 17, the front wall 260a lies parallel to the substrate W held on the substrate holder 8, and the two side walls 260b are fixed to both side ends of the front wall 260. The cover member 260 has a lower open end. As shown in FIGS. 16A and 16B, two inversely L-shaped joints 262 are attached to upper portions of the side wall 260b. The cover member 260 is coupled to the support member 210 through these joints 262. Therefore, the cover member 260 is moved in the horizontal direction together with the substrate holder 8 by the transporter 100, while the cover member 260 is not movable in the vertical direction together with the substrate holder 8 and the substrate W. The cover member 260 is located forward of the substrate holder 8 and the substrate W with respect to the transporting direction of the substrate holder 8.

The front wall 260a has a cutout 261 defined in an upper portion thereof, and the lower open end of the hood 206 is located above the cutout portion 261. The clean air, supplied from the gas flow generator 200, is introduced through the cutout 261 into a space between the substrate holder 8 and the cover member 260, flows downwardly in this space between the substrate holder 8 and the cover member 260, and flows out of the space at the lower end of the cover member 260. Since the cover member 260 is located forward of the substrate W held by the substrate holder 8 with respect to the transporting direction of the substrate holder 8 and the clean gas flow is formed in the space between the substrate holder 8 and the cover member 260, the contamination of the substrate W is more reliably prevented.

Figure 18:
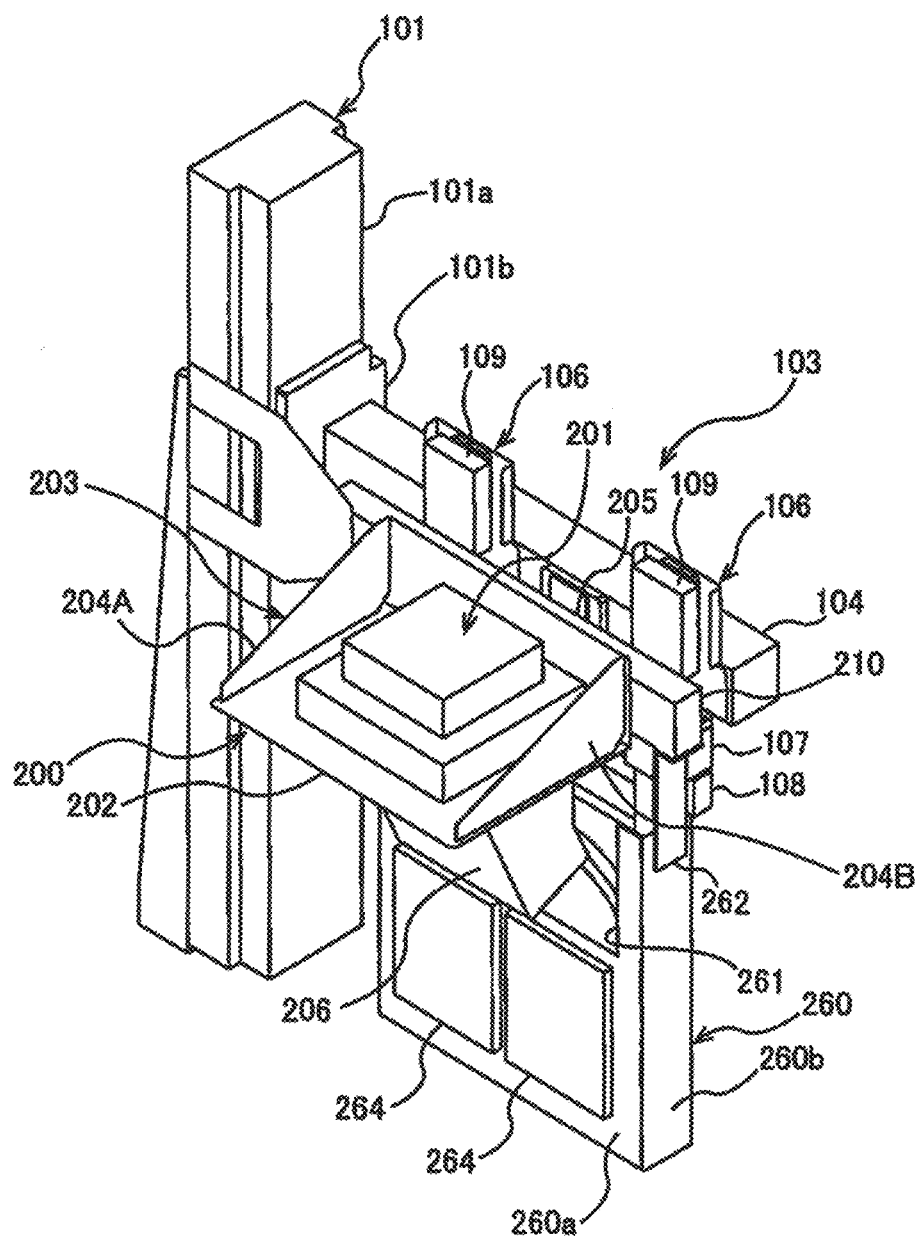
FIG. 18 is a perspective view of a part of the plating apparatus having heating elements mounted to the cover member.

Some types of plating solution are required to be kept at a high temperature while the substrate W is being plated in the plating solution. However, when the substrate W and the substrate holder 8, which are at a lower temperature, are immersed into the plating solution that is kept at the high temperature, the temperature of the plating solution is lowered. In order to prevent such a temperature drop, heating elements 264, e.g., heaters, may be mounted to the cover member 260 as shown in FIG. 18. In FIG. 18, two heating elements 264 are mounted to the front wall 260a of the cover member 260. However, the number and location of heating elements 264 are not limited to this embodiment illustrated. The heating elements 264, disposed on the cover member 260, transfer heat to the substrate W and the substrate holder 8, thereby heating the substrate W and the substrate holder 8. As a result, when the substrate W and the substrate holder 8 are immersed into the plating solution, the temperature of the plating solution is not lowered.

Figure 19:
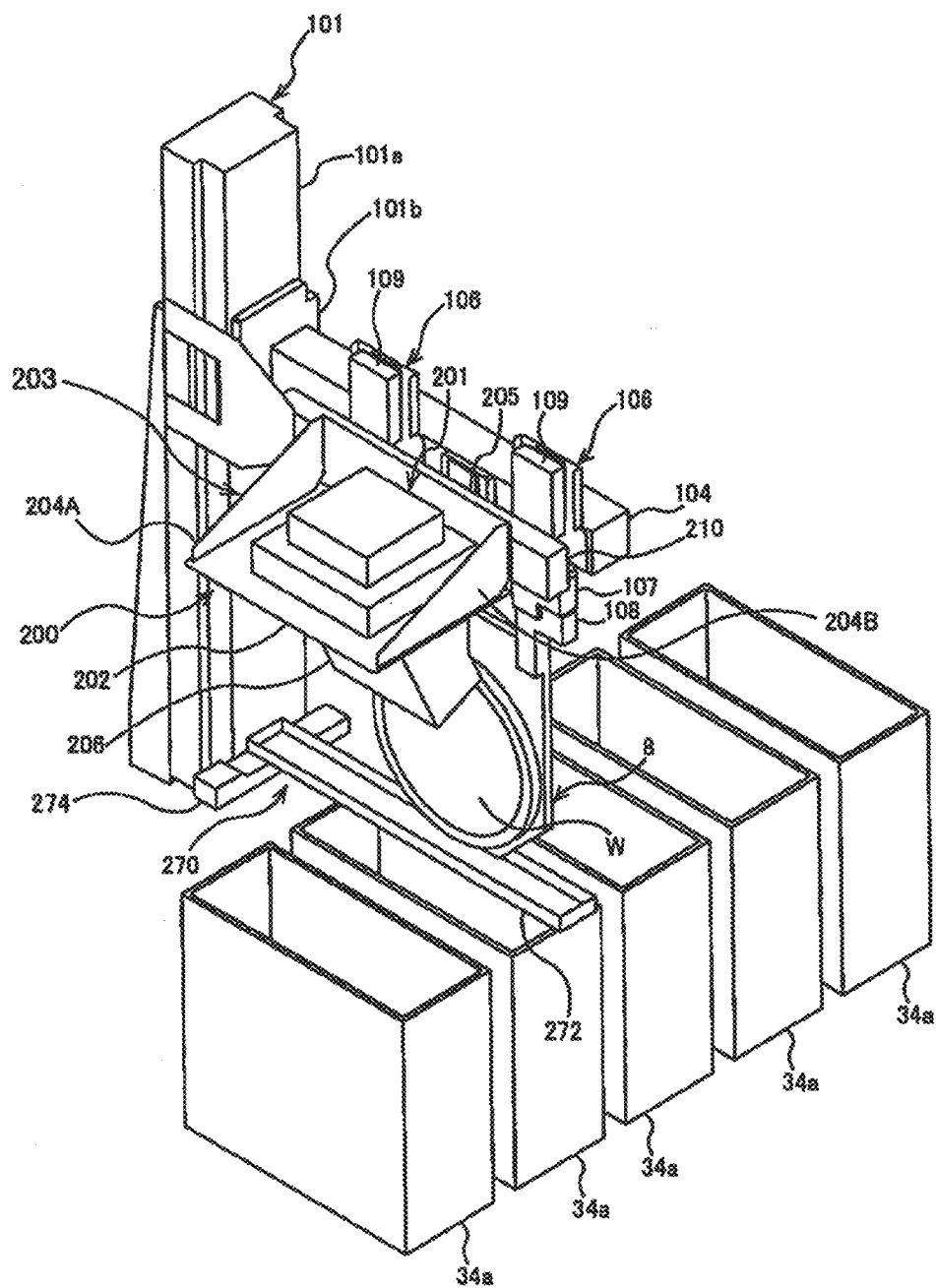
FIG. 19 is a perspective view of a part of the plating apparatus having a liquid-receiving unit.

FIG. 19 shows a perspective view of a part of the plating apparatus having a liquid-receiving unit 270. When the substrate holder 8 is pulled up from the processing bath 110, the processing liquid remains on the substrate W and the substrate holder 8. If the substrate holder 8 and the substrate W are transported with the processing liquid remaining thereon, the processing liquid may drop from the substrate holder 8 while the substrate holder 8 and the substrate W are being transported, possibly causing the contamination. In order to prevent this, the liquid-receiving unit 270 may be provided below the substrate holder 8 as shown in FIG. 19. The liquid-receiving unit 270 includes a tray 270 for receiving the processing liquid dropping from the substrate holder 8 and an actuator 274 for moving the tray 270 in the horizontal direction. The tray 272 is located above the processing bath 110 and moved in the horizontal direction by the actuator 274. The actuator 274 is an electric actuator comprising a combination of a ball screw mechanism and a servomotor. The tray 272 is coupled to the actuator 274, which is mounted to the base element 101a of the lifter 101. The liquid-receiving unit 270 is movable in the horizontal direction together with the substrate holder 8 by the transporter 100, but is not movable in the vertical direction together with the substrate holder 8 and the substrate W.

Figure 20:
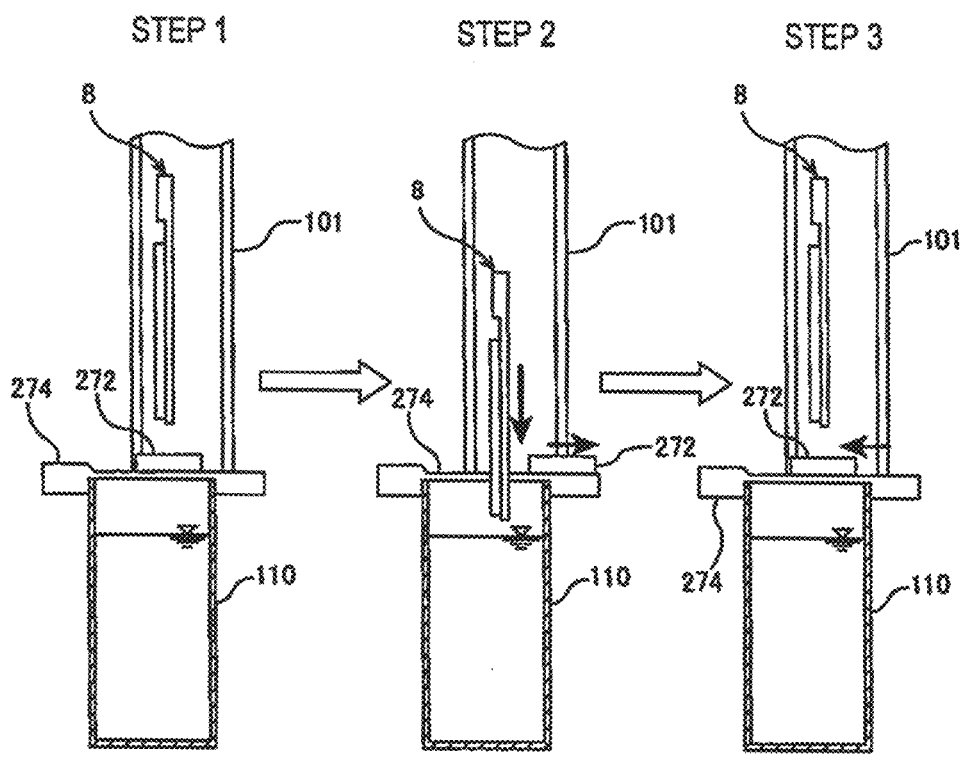
FIG. 20 is a view showing operations of the liquid-receiving unit and the substrate holder.

FIG. 20 is a schematic view showing operations of the liquid-receiving unit 270 and the substrate holder 8. In step 1, the substrate holder 8 is moved to a predetermined position above the processing bath 110 by the transporter 100. Then, in step 2, the actuator 274 moves the tray 272 in the horizontal direction to a predetermined retreated position, and the lifter 101 of the transporter 100 lowers the arm 104 together with the substrate holder 8. In order to prevent the substrate holder 8 from contacting the tray 272, the movement of the tray 272 to the retreated position is started before or at the same time the substrate holder 8 is started to be lowered. The lifter 101 lowers the arm 104 to thereby set the substrate holder 8 in a predetermined position in the processing bath 110.

After the substrate W is processed in the processing bath 110, the gripper 103 of the arm 104 grips the substrate holder 8, and the lifter 101 elevates the arm 104 to thereby pull up the substrate holder 8 from the processing bath 110. When the arm 104 is elevated until the substrate holder 8 reaches a predetermined position, the actuator 274 moves the tray 272 in the horizontal direction from the retreated position to a liquid receiving position beneath the substrate holder 8 in step 3. The processing liquid that drops from the substrate holder 8 is received by the tray 272. The tray 272 that is kept in the liquid receiving position as illustrated in the step 3 is moved together with the substrate holder 8 to the next processing bath by the transporter 100.

As shown in FIG. 19, when the gas flow generator 200 generates the downward flow of the clean gas along the surface of the substrate W, the processing liquid attached to the substrate W and the substrate holder 8 moves on the surfaces of the substrate W and the substrate holder 8, thus forming large liquid droplets, which are liable to drop off the substrate W and the substrate holder 8. According to the present embodiment, the liquid droplets that drop off the substrate W and the substrate holder 8 are received by the liquid-receiving unit 270. Therefore, it is possible to prevent the contamination of the next processing bath 110 that is present below the substrate W and the substrate holder 8.

Figure 21:
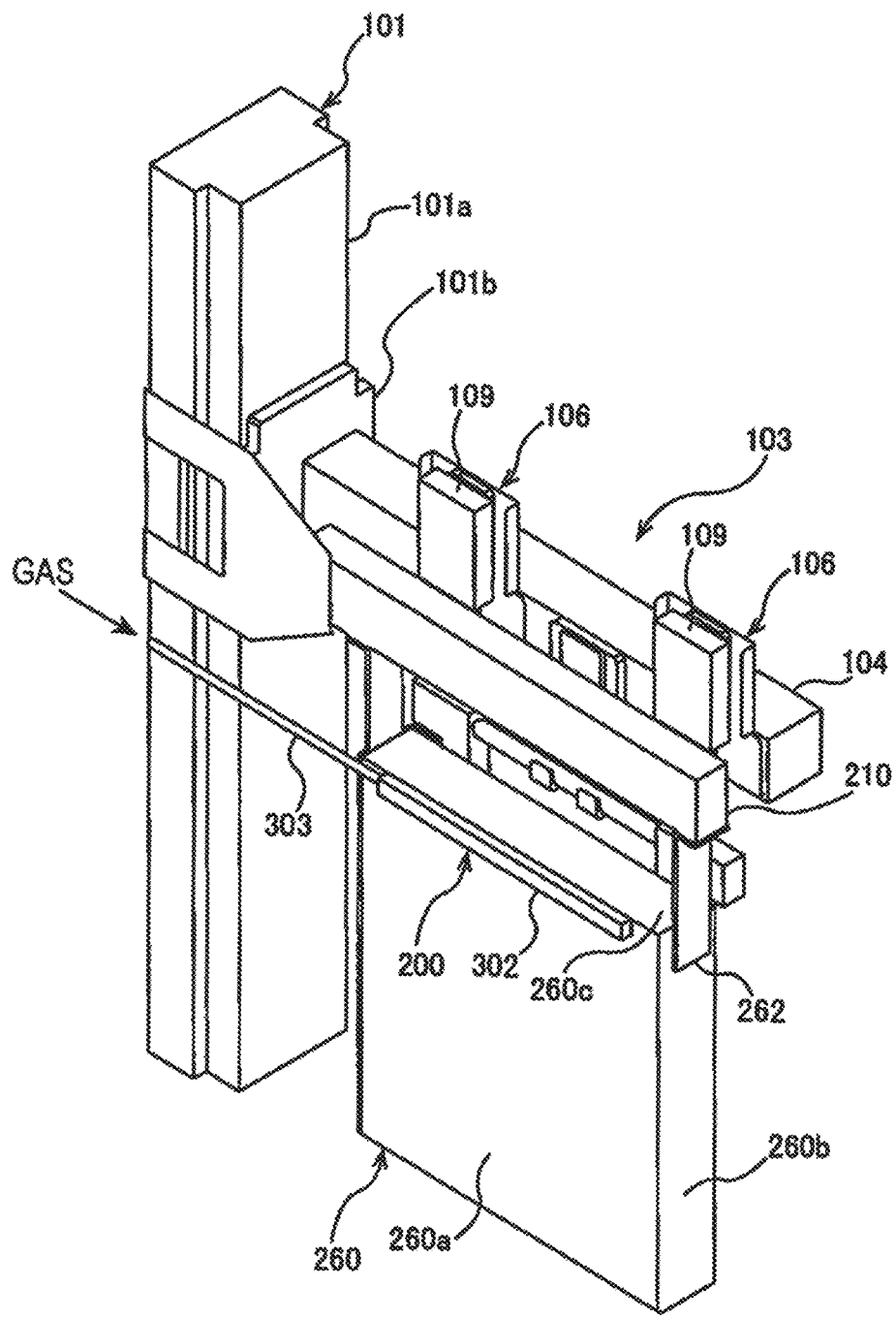
FIG. 21 is a perspective view of a part of a plating apparatus according to another embodiment.
Figure 22:
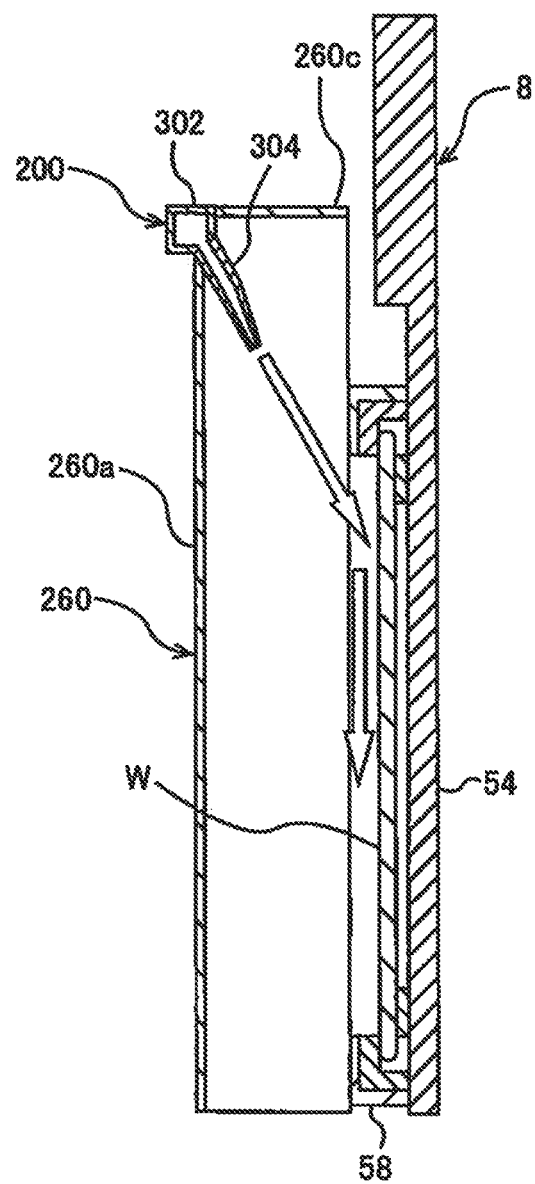
FIG. 22 is a cross-sectional view of a part of the cover member of the plating apparatus shown in FIG. 21.

FIG. 21 shows a perspective view of a part of the plating apparatus according to another embodiment. FIG. 22 shows a cross section of a part of the cover member 260 of the plating apparatus shown in FIG. 21. According to the embodiment shown in FIGS. 21 and 22, the gas flow generator 200 does not have the fan filter unit 201, and instead has a gas inlet pipe 302 and a slit nozzle 304. The slit nozzle 304 is coupled to the gas inlet pipe 302, which is coupled to a gas supply pipe 303 which is coupled to a gas supply source, not shown. The gas to be used is preferably an inert gas, such as a nitrogen gas.

As shown in FIG. 21, the plating apparatus according to the present embodiment has the cover member 260, which is basically the same as the cover member 260 shown in FIG. 15 but is different in that it additionally has an upper wall 260c. The cover member 260 according to the present embodiment does not have the cutout 261 shown in FIG. 15. The gas flow generator 200 is disposed on the upper portion of the cover member 260, and is movable in the horizontal direction together with the substrate holder 8 and the substrate W by the transporter 100.

As shown in FIG. 22, the slit nozzle 304 is a gas nozzle having a slit defined in its tip end. The tip end of the slit nozzle 304 is located within the cover member 260 and oriented toward the substrate W held by the substrate holder 8. The slit of the slit nozzle 304 has a width equal to or slightly larger than the width, i.e., the diameter, of the substrate W so that the clean gas flow travels uniformly on the surface of the substrate W. The gas that is supplied from the gas supply source, which is not shown, flows through the gas supply pipe 303 and the gas inlet pipe 302, and is discharged from the slit nozzle 304 toward the substrate W. The clean gas flow moves downwardly through the space between the substrate holder 8 and the cover member 260, and flows out of the space at the lower end of the cover member 260. Since the cover member 260 is located forward of the substrate W held by the substrate holder 8 with respect to the transporting direction of the substrate holder 8 and the clean gas flow is formed between the substrate holder 8 and the cover member 260, the contamination of the substrate W is more reliably prevented. The slit nozzle 304 may be replaced with a plurality of gas nozzles coupled to the gas inlet pipe 302.

The embodiments described above may be combined appropriately. For example, the heating elements 264 shown in FIG. 18 may be mounted to the front wall 260a shown in FIG. 21. The embodiment shown in FIG. 21 may have both the static electricity eliminator 250 and the liquid-receiving unit 270.

While the above-described embodiments are directed to the electroplating apparatus, the present invention is also applicable to an electroless plating apparatus. An electroless plating apparatus may preferably have a substrate holder for vertically holding a substrate by engaging its edge, and may not necessarily have sealing members for keeping a peripheral portion and a back surface (which is opposite to a surface to be plated) of the substrate out of contact with a plating solution.

Figure 23:
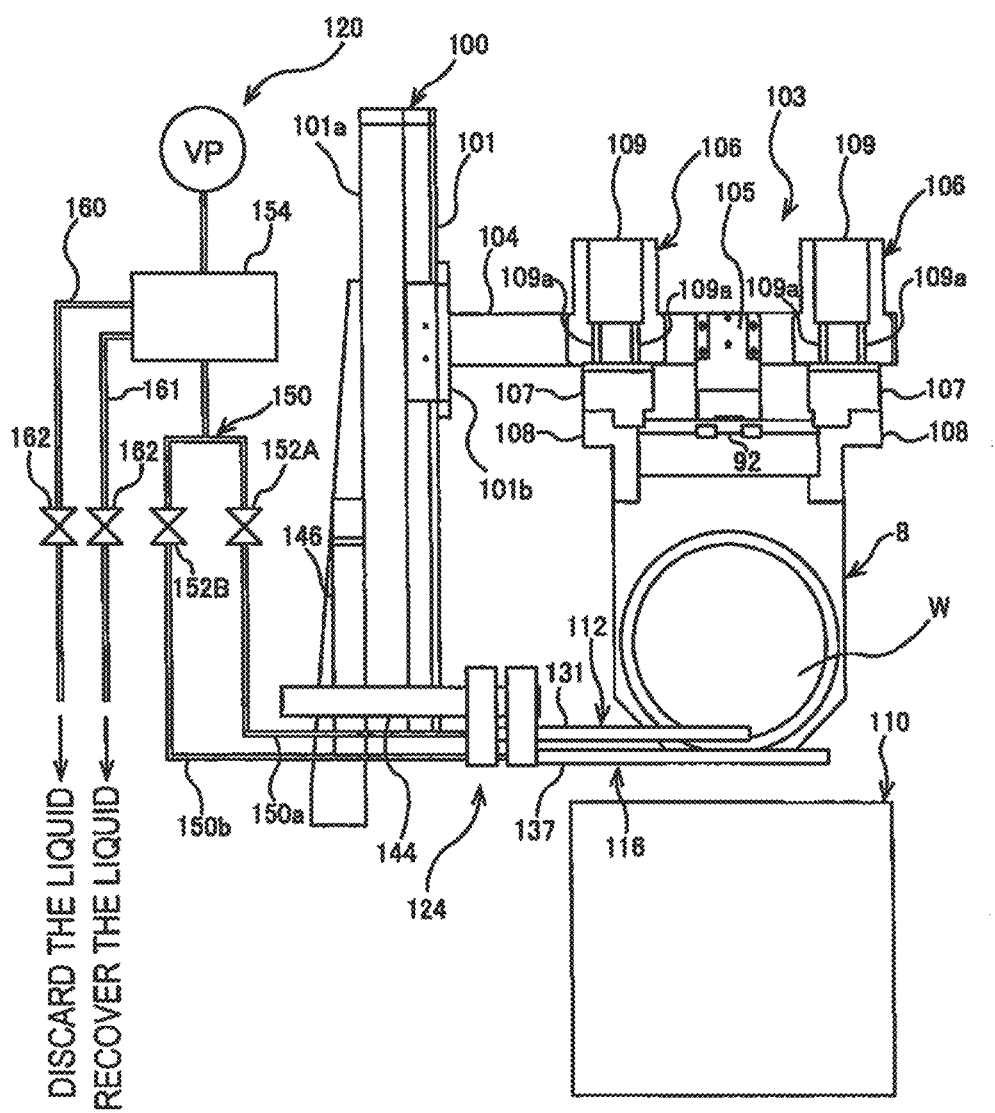
FIG. 23 is a front view showing a transporter that is holding a substrate holder.

FIG. 23 shows a front view of a plating apparatus according to still another embodiment. Specifically, FIG. 23 shows a front view of transporter 100 that is holding the substrate holder 8. As shown in FIG. 23, the plating apparatus has a first suction mechanism 112 for sucking the processing liquid that has gathered in a region where the substrate-side sealing member 66 of the substrate holder 8 and the substrate W contact each other, a second suction mechanism 116 for sucking the processing liquid remaining in a wide region on the surface of the substrate W, a processing liquid recovering unit 120 for recovering the processing liquid that has been sucked, and a moving mechanism 124 for moving the first suction mechanism 112 and the second suction mechanism 116 relative to the substrate holder 8.

As described later, when the substrate holder 8, holding the substrate W, is raised in the vertical position from the processing bath 110, the processing liquid is liable to gather especially on the lowermost peripheral portion of the substrate W at which the substrate-side sealing member 66 contacts the substrate W. The first suction mechanism 112 sucks the processing liquid that has been collected on this lowermost peripheral portion of the substrate W.

Figure 24:
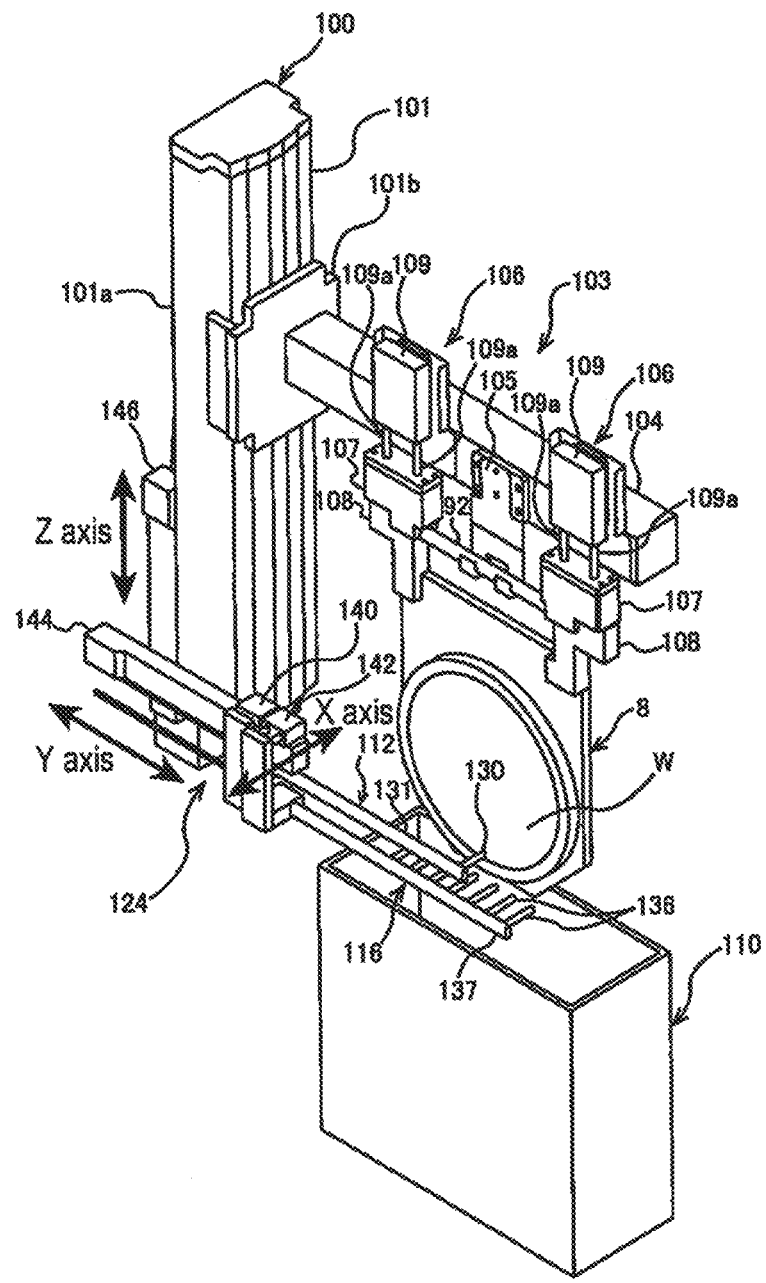
FIG. 24 is a perspective view of a part of the plating apparatus shown in FIG. 23.

FIG. 24 shows a perspective view of the transporter 100, the substrate holder 8, the first suction mechanism 112, the second suction mechanism 116, and the moving mechanism 124 shown in FIG. 23. In FIG. 24, the processing liquid recovering unit 120 is omitted from illustration. As shown in FIG. 24, the first suction mechanism 112 has a single first suction nozzle 130 and a first suction pipe 131. The second suction mechanism 116 has a plurality of second suction nozzles 136 and a second suction pipe 137. The first suction nozzle 130 is coupled to the first suction pipe 131 and extends from the first suction pipe 131 toward the substrate W held by the substrate holder 8. The second suction nozzles 136 are coupled to the second suction pipe 137 and extend from the second suction pipe 137 toward the substrate W held by the substrate holder 8. Each of the first suction nozzle 130 and the second suction nozzles 136 comprises a tubular nozzle.

As shown in FIG. 24, the moving mechanism 124 has a first X-axis actuator 140 for moving the first suction nozzle 130 in directions perpendicular to the surface of the substrate W, i.e., directions toward and away from the surface of the substrate W (hereinafter these directions will be referred to as "X-axis directions"), and a second X-axis actuator 142 for moving the second suction nozzles 136 in the X-axis directions. The moving mechanism 124 further has a Y-axis actuator 144 for moving the first X-axis actuator 140, the first suction mechanism 112, the second X-axis actuator 142, and the second suction mechanism 116 in horizontal directions parallel to the surface of the substrate W (hereinafter these directions will be referred to as "Y-axis directions"). The moving mechanism 124 further has a Z-axis actuator 146 for moving the first X-axis actuator 140, the second X-axis actuator 142, the Y-axis actuator 144, the first suction mechanism 112, and the second suction mechanism 116 in vertical directions (hereinafter these directions will be referred to as "Z-axis directions"). The X-axis directions, the Y-axis directions, and the Z-axis directions are perpendicular to each other.

The lifter 101 includes the base element 101a which extends vertically and the vertically-movable element 101b which is vertically movable relative to the base element 101a. The arm 104 is fixed to the vertically-movable element 101b. The first suction mechanism 112, the second suction mechanism 116, and the moving mechanism 124 are mounted to the transporter 100. More specifically, the Z-axis actuator 146 is mounted to the base element 101a of the lifter 101 of the transporter 100, and the Y-axis actuator 144 is mounted to the Z-axis actuator 146. The first X-axis actuator 140 and the second X-axis actuator 142 are mounted to the Y-axis actuator 144. The operations of the moving mechanism 124 are controlled by the controller 3.

Each of the actuators 144, 146 is an electric actuator constituted by a combination of a ball screw mechanism and a servomotor. Therefore, the controller 3 can precisely control motions of the first suction nozzle 130 and the second suction nozzles 136. More specifically, the controller 3 can control the first suction nozzle 130 and the second suction nozzles 136 to move along paths which have been preset in a plane parallel to the substrate W. Each of the first X-axis actuator 140 and the second X-axis actuator 142 may be a pneumatic cylinder, or may be an electric actuator as with the actuators 144, 146.

As shown in FIG. 23, the processing liquid recovering unit 120 has a vacuum line 150 coupled to the first suction pipe 131 and the second suction pipe 137, suction switching valves 152A, 152B attached to the vacuum line 150, a recovery tank 154 for recovering the processing liquid that has been sucked, and a vacuum device VP coupled to the recovery tank 154. The vacuum line 150 has a first vacuum line 150a coupled to the first suction pipe 131 and a second vacuum line 150b coupled to the second suction pipe 137. The suction switching valve 152A is attached to the first vacuum line 150a, and the suction switching valve 152B is attached to the second vacuum line 150b. The suction switching valve 152A and the suction switching valve 152B have an identical structure. The suction switching valve 152A and the suction switching valve 152B are opened and closed under the control of the controller 3. The vacuum line 150 is coupled to the recovery tank 154. When the vacuum device VP is set in motion, the processing liquid that remains on the substrate-side sealing member 66 of the substrate holder 8 and the surface of the substrate W is sucked through the first suction mechanism 112 and the second suction mechanism 116.

In this embodiment, the vacuum device VP is disposed downstream of the recovery tank 154. Instead, the vacuum device VP may be disposed upstream of the recovery tank 154. In the case where the vacuum device VP is disposed upstream of the recovery tank 154, the vacuum device VP is required to be of such a structure that a liquid can flow through the vacuum device VP. For example, the vacuum device VP may be a bimorph pump using a bimorph element.

When sucking the processing liquid through the first suction nozzle 130, the suction switching valve 152B is closed and the suction switching valve 152A is opened. The vacuum device VP is actuated to develop a vacuum in the recovery tank 154, the first vacuum line 150a, the first suction pipe 131, and the first suction nozzle 130, thereby enabling the first vacuum nozzle 130 to suck the processing liquid that remains on the substrate W and the substrate-side sealing member 66. The processing liquid is delivered into the recovery tank 154 through the first vacuum nozzle 130, the first suction pipe 131, and the first vacuum line 150a in this order.

When sucking the processing liquid through the second suction nozzles 136, the suction switching valve 152A is dosed and the suction switching valve 152B is opened. The vacuum device VP is actuated to develop a vacuum in the recovery tank 154, the second vacuum line 150b, the second suction pipe 137, and the second suction nozzles 136, thereby enabling the second vacuum nozzles 136 to suck the processing liquid that remains on the surface of the substrate W. The processing liquid is delivered into the recovery tank 154 through the second suction nozzles 136, the second suction pipe 137, and the second vacuum line 150b in this order.

A drain pipe 160 and a processing liquid recovery pipe 161 are coupled to the recovery tank 154. The processing liquid that has been collected in the recovery tank 154 is discharged from the recovery tank 154 through the drain pipe 160 or the processing liquid recovery pipe 161. For example, in the case where the processing liquid is the plating solution, the plating solution that has been collected in the recovery tank 154 is discharged from the recovery tank 154 through the processing liquid recovery pipe 161 back to the plating bath 34 for reuse in plating of substrates. In the case where the processing liquid is pure water, e.g., the rinsing liquid or the pretreatment liquid, the pure water that has been collected in the recovery tank 154 is discharged from the recovery tank 154 through the drain pipe 160 out of the plating apparatus and discarded. The drain pipe 160 and the processing liquid recovery pipe 161 are provided with on-off valves 162, respectively.

Figure 25:
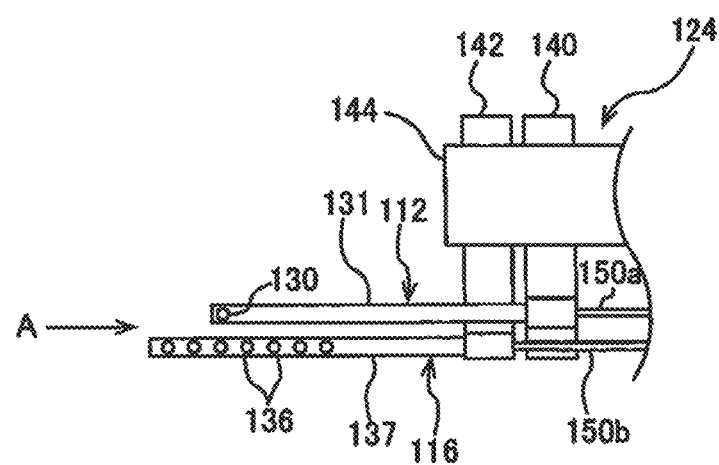
FIG. 25 is an enlarged view of a first suction mechanism, a second suction mechanism, and a part of a moving mechanism.
Figure 26A:
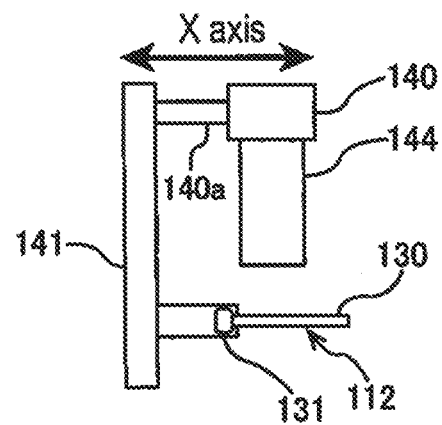
FIG. 26A is a view of the first suction mechanism shown in FIG. 25 as viewed from a direction indicated by arrow A shown in FIG. 25.
Figure 26B:
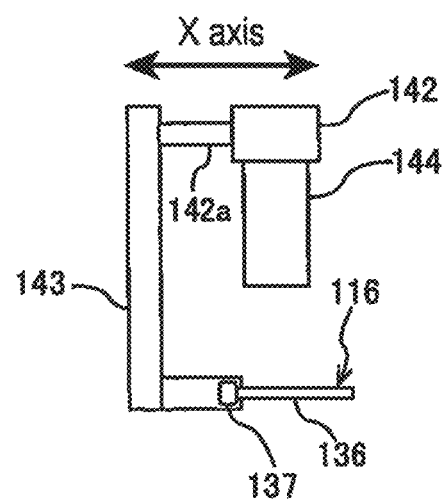
FIG. 26B is a view of the second suction mechanism shown in FIG. 25 as viewed from the direction indicated by the arrow A shown in FIG. 25.

FIG. 25 shows an enlarged view of the first suction mechanism 112, the second suction mechanism 116, and a part of the moving mechanism 124. FIG. 26A is a view of the first suction mechanism 112 shown in FIG. 25 as viewed from a direction indicated by arrow A shown in FIG. 25, and FIG. 26B is a view of the second suction mechanism 116 shown in FIG. 25 as viewed from the direction indicated by the arrow A shown in FIG. 25. In this embodiment, each of the first X-axis actuator 140 and the second X-axis actuator 142 is a pneumatic cylinder. As shown in FIGS. 25, 26A, and 26B, the first suction nozzle 130 is secured to the first suction pipe 131, and the second suction nozzles 136 are secured to the second suction pipe 137.

As shown in FIG. 26A, the first X-axis actuator 140 is secured to the Y-axis actuator 144. The first X-axis actuator 140 has a piston rod 140a which is coupled to the first suction pipe 131 through a coupling member 141. When the piston rod 140a is extended and contracted, the first suction nozzle 130 and the first suction pipe 131 are moved in the directions indicated by the arrows, i.e., the X-axis directions, as shown in FIG. 26A.

As shown in FIG. 26B, the second X-axis actuator 142 is secured to the Y-axis actuator 144. The second X-axis actuator 142 has a piston rod 142a which is coupled to the second suction pipe 137 through a coupling member 143. When the piston rod 142a is extended and contracted, the second suction nozzles 136 and the second suction pipe 137 are moved in the directions indicated by the arrows, i.e., the X-axis directions, as shown in FIG. 26B.

The first suction nozzle 130 and the second suction nozzles 136 are arranged so as to face the surface of the substrate W that has been raised from the processing tank 110. The first suction nozzle 130 and the first suction pipe 131 are located above the second suction nozzles 136 and the second suction pipe 137 so that the first suction nozzle 130 and the first suction pipe 131 do not contact the second suction nozzles 136 and the second suction pipe 137.

Figure 27A:
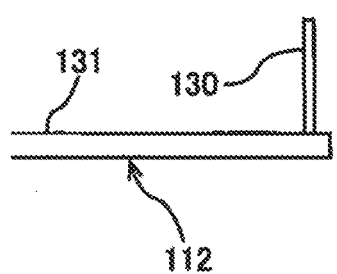
FIG. 27A is a plan view of a first suction nozzle and a first suction pipe.
Figure 27B:
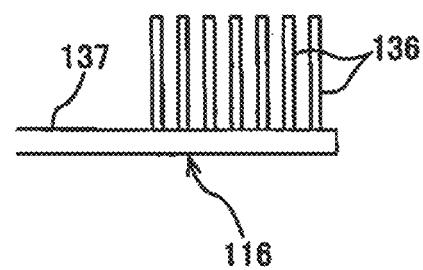
FIG. 27B is a plan view of a plurality of second suction nozzles and a second suction pipe.

FIG. 27A shows a plan view of the first suction nozzle 130 and the first suction pipe 131, and FIG. 27B shows a plan view of the second suction nozzles 136 and the second suction pipe 137. In this embodiment, the first suction mechanism 112 has the single first suction nozzle 130, and the second suction mechanism 116 has seven second suction nozzles 136. The second suction nozzles 136 are arranged along the horizontal direction at equal intervals. It is noted that the number of first suction nozzle 130 and the number of second suction nozzles 136 are not limited to those illustrated in this embodiment. The first X-axis actuator 140 and the second X-axis actuator 142 shown in FIG. 25 are capable of moving the first suction mechanism 112 and the second suction mechanism 116 in the X-axis directions independently of each other.

The moving mechanism 124 is fixed to the base element (or a stationary component) 101a of the lifter 101. The first suction mechanism 112 and the second suction mechanism 116 are coupled to the moving mechanism 124. The first suction mechanism 112, the second suction mechanism 116, and the moving mechanism 124 are not movable in the vertical direction together with the substrate holder 8 gripped by the arm 104, but are movable in the horizontal direction together with the substrate holder 8 gripped by the arm 104. Therefore, when the substrate holder 8 is transported from one processing bath to another processing bath by the transporter 100, the first suction mechanism 112, the second suction mechanism 116, and the moving mechanism 124 are moved in the horizontal direction together with the substrate holder 8.

A distance between the substrate W held on the substrate holder 8 gripped by the arm 104 and the first suction nozzle 130 can be changed by the first X-axis actuator 140. A distance between the substrate W held on the substrate holder 8 gripped by the arm 104 and the second suction nozzles 136 can be changed by the second X-axis actuator 142. The first X-axis actuator 140 and the second X-axis actuator 142 are operable independently of each other. Therefore, the first suction nozzle 130 and the second suction nozzles 136 are movable closer to and away from the substrate W independently of each other.

Figure 28A:
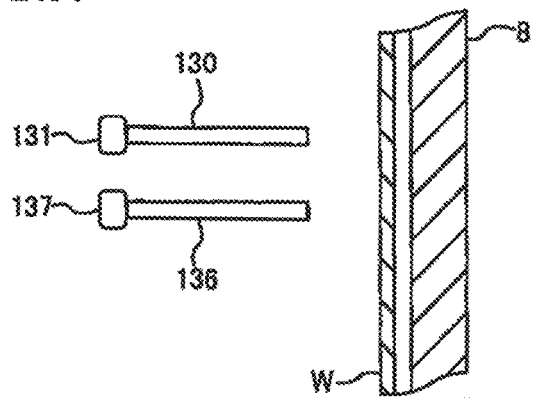
FIG. 28A is a view showing the first suction nozzle and the second suction nozzles in a retreated position.
Figure 28B:
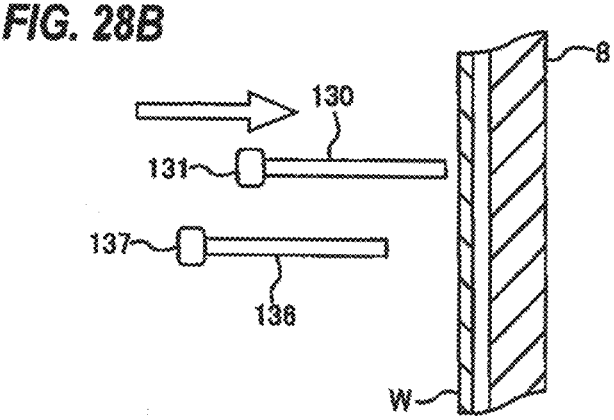
FIG. 28B is a view showing the first suction nozzle in a suction position and the second suction nozzles in the retreated position.
Figure 28C:
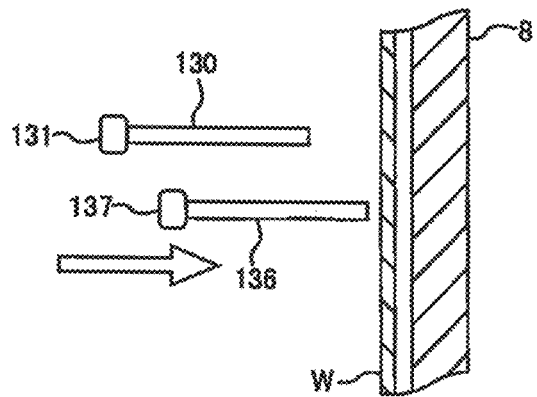
FIG. 28C is a view showing the first suction nozzle in the retreated position and the second suction nozzles in the suction position.

FIG. 28A shows the first suction nozzle 130 and the second suction nozzles 136 in a predetermined retreated position which is spaced from the substrate W. FIG. 28B shows the first suction nozzle 130 in a predetermined suction position which is close to the substrate W and the second suction nozzles 136 in the retreated position. FIG. 28C shows the first suction nozzle 130 in the retreated position and the second suction nozzles 136 in the suction position. As shown in FIGS. 28A through 28C, the first suction nozzle 130 and the second suction nozzles 136 are alternately moved closer to the substrate W to suck the processing liquid remaining on the substrate W.

The first and second X-axis actuators 140, 142 are configured to move the first and second suction nozzles 130, 136 toward the substrate W within a range in which the first and second suction nozzles 130, 136 do not contact the surface of the substrate W hold by the substrate holder 8. The first suction mechanism 112 and the second suction mechanism 116 can suck the processing liquid on the substrate W while the substrate holder 8 is moving. More specifically, the second suction mechanism 116 sucks the processing liquid on the substrate W while the substrate holder 8 is being raised from the processing bath 110 by the transporter 100, and the first suction mechanism 112 sucks the processing liquid on the substrate W while the substrate holder 8 is being moved or transported in the horizontal direction by the transporter 100.

Figure 29A:
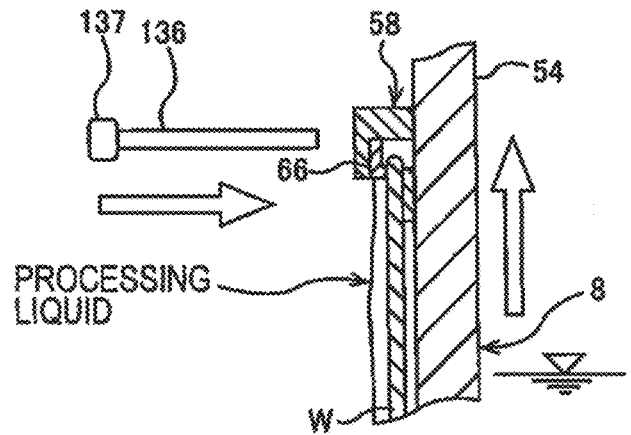
FIG. 29A is a schematic view showing the second suction nozzles in the predetermined retreated position.
Figure 29B:
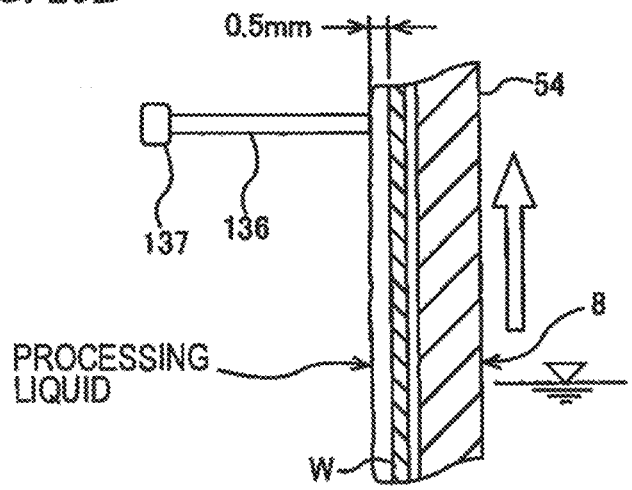
FIG. 29B is a schematic view showing the second suction nozzles when sucking a processing liquid remaining on a surface of a substrate.
Figure 29C:
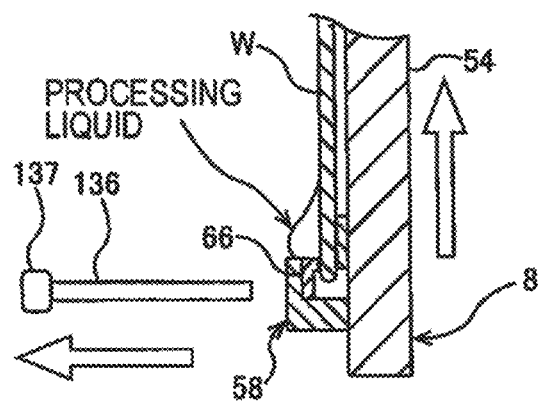
FIG. 29C is a schematic view showing the second suction nozzles that have been moved to the predetermined retreated position again after sucking the processing liquid from the substrate.

Operations of the second suction nozzles 136 will be described below with reference to FIGS. 29A through 29C. Operations of the first suction nozzle 130 will be described later. FIG. 29A shows the second suction nozzles 136 in the retreated position spaced from the surface of the substrate W. FIG. 29B shows the second suction nozzles 136 that have been moved closer to the substrate W and are sucking the processing liquid remaining on the surface of the substrate W. FIG. 29C shows the second suction nozzles 136 that are moved back to the retreated position after sucking the processing liquid. As shown in FIGS. 29A through 29C, the second suction nozzles 136 are moved closer to and away from the surface of the substrate W by the second X-axis actuator 142.

After the substrate W and the substrate holder 8 are immersed and processed in the processing liquid in the processing bath 110, the lifter 101 elevates the arm 104, pulling up the substrate W and the substrate holder 8 out of the processing bath 110. In order not to cause the second holding member 58 of the ascending substrate holder 8 to contact the second suction nozzles 136, the second suction nozzles 136 (and the first suction nozzle 130) are disposed in the retreated position, as shown in FIG. 29A. After the second holding member 58 passes the second section nozzles 136, the second X-axis actuator 142 moves the second suction nozzles 136 toward the substrate W until the tip ends of the second suction nozzles 136 are brought into contact with the processing liquid remaining on the surface of the substrate W, as shown in FIG. 29B. At this time, the second suction nozzles 136 are in the suction position. The tip ends of the second suction nozzles 136 in the suction position are spaced from the surface of the substrate W by a distance of about 0.5 mm. The distance of 0.5 mm is illustrated by way of example only, and the distance between the second suction nozzles 136 in the suction position and the surface of the substrate W is not limited to the illustrated embodiment. If the vacuum device VP has a high vacuum suction capability, the second suction nozzles 136 may not necessarily be held in contact with the processing liquid on the surface of the substrate W.

When the second suction nozzles 136 are moved to the suction position shown in FIG. 29B, the suction switching valve 152B is opened. At this time, the suction switching valve 152A remains closed. The vacuum device VP is actuated to produce a vacuum in the second suction nozzles 136, which suck the processing liquid from the surface of the substrate W. During sucking of the processing liquid, the substrate W is being elevated, while the second suction nozzles 136 are fixed in position. In another embodiment, the Y-axis actuator 144 and the Z-axis actuator 146 may move the second suction nozzles 136 in a plane parallel to the substrate W independently of the upward movement of the substrate W. For example, while the transporter 100 is moving the substrate holder 8, holding the substrate W, in the horizontal direction, the second suction nozzles 136 may suck the processing liquid on the substrate W.

The second suction nozzles 136 may start sucking the processing liquid at the same time or before the second suction nozzles 136 start moving. While the substrate W and the substrate holder 8 are being elevated, the second suction nozzles 136 suck the processing liquid from the wide region on the surface of the substrate W. Specifically, the second suction nozzles 136 suck the processing liquid from a central rectangular region shown cross-hatched in FIG. 30 on the surface of the substrate W. When the substrate W is further elevated until the second holding member 58 approaches the second suction nozzles 136, the second suction nozzles 136 are moved away from the substrate W to the retreated position, as shown in FIG. 29C.

Since the second suction nozzles 136 can suck the processing liquid from the wide region on the surface of the substrate W while the substrate holder 8 is being elevated, an amount of the processing liquid on the substrate W can be reduced even if the substrate holder 8 is elevated at a higher speed. Moreover, a less time is required for draining the processing liquid off the substrate W, a takt time of the plating apparatus can be reduced and as a result a throughput can be improved.

The processing liquid that remains on the peripheral portion of the substrate W and the surface of the substrate-side sealing member 66 flows downwardly by gravity to gather on the lower portion of the substrate-side sealing member 66. On one hand the second suction nozzles 136 can suck the processing liquid from the central rectangular region shown in FIG. 30 on the surface of the substrate W, but on the other hand the second suction nozzles 136 are unable to suck the processing liquid that remains in a lower region of the surface of the substrate W and on the lower portion of the substrate-side sealing member 66. More specifically, the second suction mechanism 116 is unable to suck the processing liquid that remains in a crescent-shaped region shown cross-hatched in FIG. 31 on the surface of the substrate W. Thus, the first suction nozzle 130 sucks the processing liquid that remains in the lower region of the surface of the substrate W and on the lower portion of the substrate-side sealing member 66.

Figure 32:
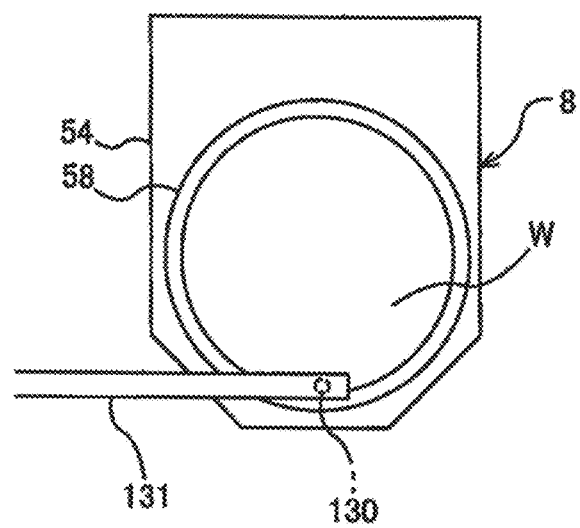
FIG. 32 is a view showing the positional relationship between the substrate holder and the first suction mechanism.
Figure 33:
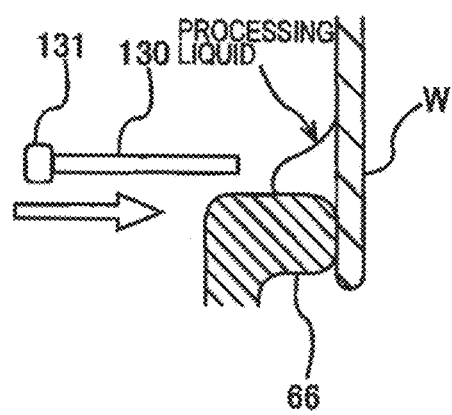
FIG. 33 is an enlarged cross-sectional view of the first suction nozzle, the substrate, and a substrate-side sealing member.

FIG. 32 shows a positional relationship between the substrate holder 8 and the first suction nozzle 130. FIG. 33 shows an enlarged cross-sectional view of the first suction nozzle 130, the substrate W, and the substrate-side sealing member 66. As shown in FIG. 33, the substrate-side sealing member 66 is held in contact with the peripheral portion of the substrate W. As described above, the processing liquid remaining on the peripheral portion of the substrate W that is contacted by the substrate-side sealing member 66 flows downwardly by gravity along the edge of the substrate-side sealing member 66, thus gathering on the lowermost peripheral portion of the substrate W that is in contact with the substrate-side sealing member 66.

The first suction mechanism 112 sucks the processing liquid that has gathered on the lower portion of the substrate-side sealing member 66. Specifically, after the above-discussed suction of the processing liquid with use of the second suction nozzles 136 is terminated, i.e., after the upward movement of the substrate holder 8 is terminated, the first suction nozzle 130 is moved toward the substrate W by the first X-axis actuator 140 to contact the processing liquid. At this time, the suction switching valve 152A is opened. The suction switching valve 152B is closed when the above-discussed suction of the processing liquid with use of the second suction nozzles 136 is terminated. The vacuum device VP is actuated to produce a vacuum in the first suction nozzle 130, which sucks the processing liquid. The first suction nozzle 130 may start sucking the processing liquid at the same time or before the first suction nozzle 130 starts moving.

Figure 31:
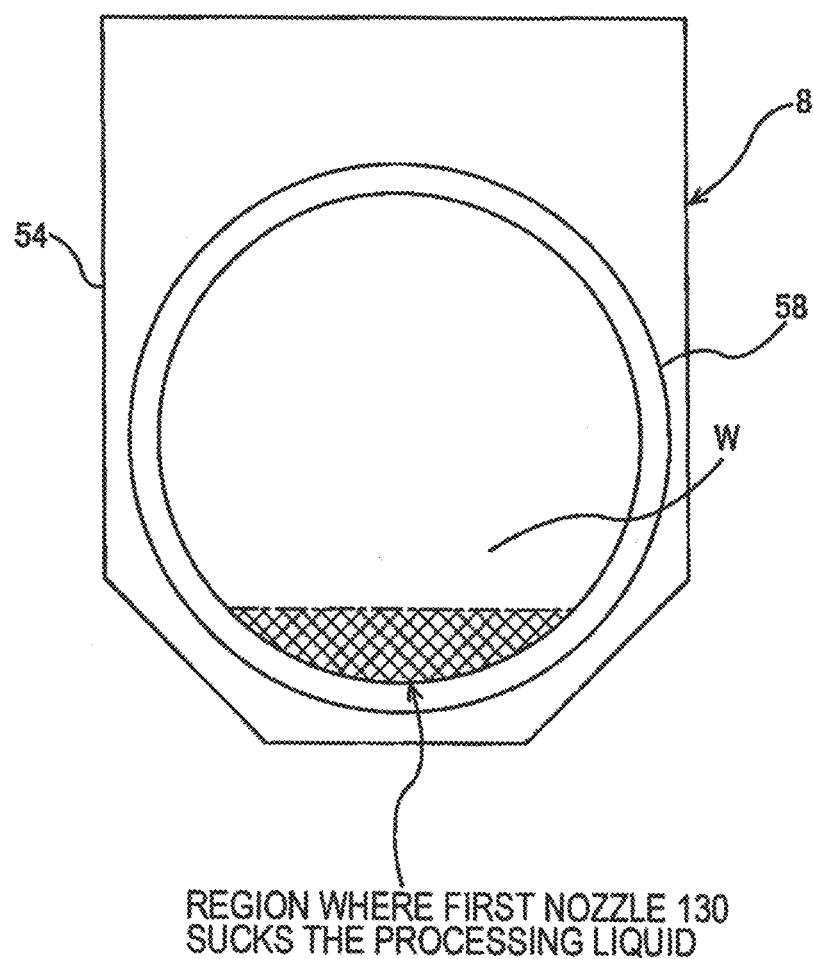
FIG. 31 is a view showing a region where the first suction nozzle sucks the processing liquid.
Figure 34:
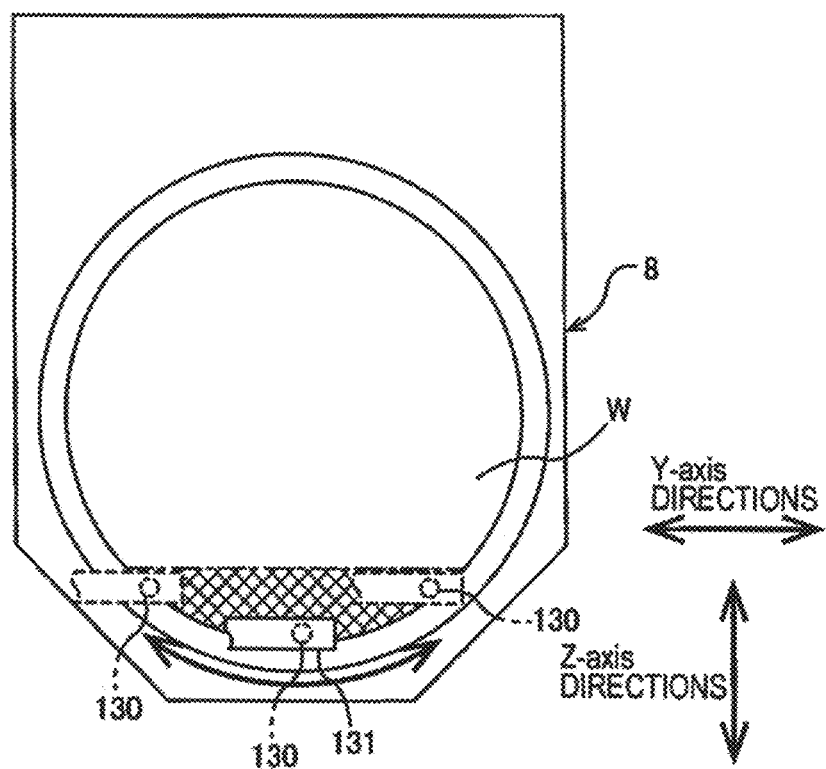
FIG. 34 is a view showing the manner in which the first suction nozzle sucks the processing liquid from the region show in FIG. 31.

As shown in FIG. 34, the first suction nozzle 130 sucks the processing liquid that remains in the crescent-shaped region shown cross-hatched in FIG. 31 while the first suction nozzle 130 is moving in the Y-axis directions and the Z-axis directions. The movement of the first suction nozzle 130 in the Y-axis directions and the Z-axis directions has been programmed in advance. The Y-axis actuator 144 and the Z-axis actuator 146 are operated simultaneously, so that the first suction nozzle 130 can move along the substrate-side sealing member 66. Therefore, the first suction nozzle 130 can suck the processing liquid that has gathered on the lower portion of the substrate-side sealing member 66. While the first suction nozzle 130 is sucking the processing liquid, the first X-axis actuator 140 is not operated so that the first suction nozzle 130 is kept away from the substrate W by the distance of, e.g., 0.5 mm.

The first suction mechanism 112 can suck the processing liquid when the substrate holder 8 and the substrate W are being transported, so long as the substrate holder 8 has been raised completely out of the processing bath 110. After the substrate holder 8 and the substrate W have been raised from the processing bath 110, the substrate holder 8 is transported together with the substrate W in the horizontal direction to a next processing bath by the transporter 100. During this transporting of the substrate holder 8 and the substrate W, the first suction mechanism 112 can suck the processing liquid that remains on the substrate W and the substrate-side sealing member 66. Therefore, the substrate holder 8 does not need to stay above the processing bath 110, and the takt time can be further reduced. As a result, the throughput can be increased.

As described above, in the blowing bath 38, the air from a blow nozzle (not shown) blows the substrate W to remove the liquid droplets from the surface of the substrate W, thereby drying the substrate W. According to the embodiment described above, the first suction nozzle 130 and the second suction nozzles 136 are capable of sucking the processing liquid from approximately the entire surface of the substrate W. As a consequence, scattering of the processing liquid in the blowing both 38 can be minimized, and therefore the contamination of the substrate W can be prevented.

Figure 35A:
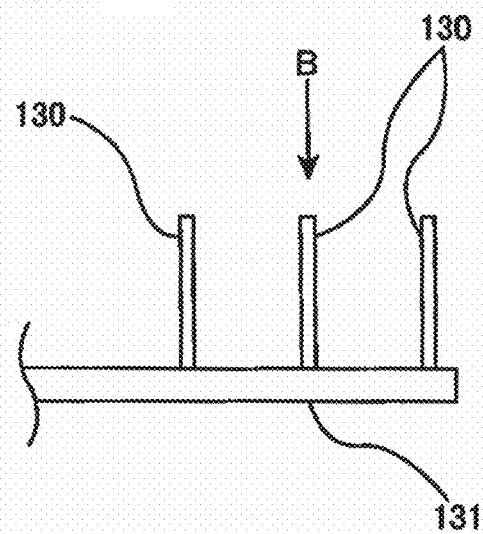
FIG. 35A is a plan view of a modification of the first suction nozzle.
Figure 35B:
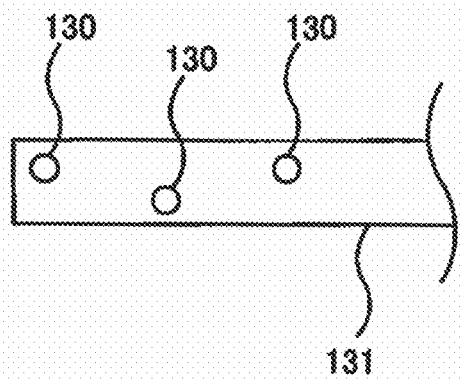
FIG. 35B is a view from a direction indicated by arrow B shown in FIG. 35A.

FIG. 35A shows a plan view of a modification of the first suction nozzle 130, and FIG. 35B is a view from a direction indicated by arrow B shown in FIG. 35A. As shown in FIGS. 35A and 35B, three first suction nozzles 130 may be provided. In this modification, the three first suction nozzles 130 are arranged along a circumferential direction of the substrate-side sealing member 66. This arrangement can allow the first suction nozzles 130 to suck a larger amount of processing liquid.

Figure 36A:
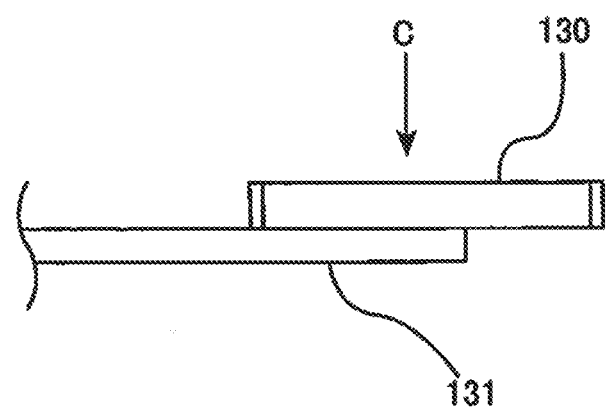
FIG. 36A is a plan view of another modification of the first suction nozzle.
Figure 36B:
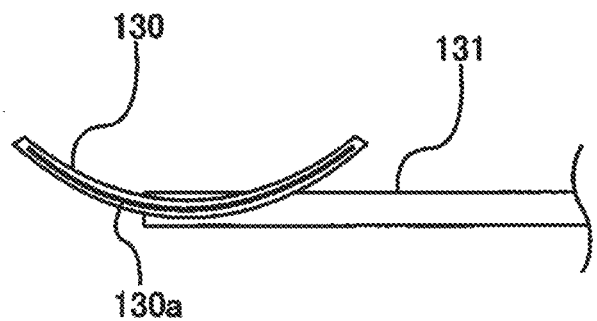
FIG. 36B is a view from a direction indicated by arrow C shown in FIG. 36A.

FIG. 36A shows a plan view of another modification of the first suction nozzle 130, and FIG. 36B is a view from a direction indicated by arrow C shown in FIG. 36A. As shown in FIGS. 36A and 36B, the first suction nozzle 130 is constituted by a slit nozzle having a slit 130a defined in its tip end. This slit 130a is in an arcuate shape that is curved along the circumferential direction of the substrate-side sealing member 66. The processing liquid that remains on the substrate-side sealing member 66 is sucked through the slit 130a. With this slit 130a formed on its tip end, the first suction nozzle 130 can suck the processing liquid remaining on the substrate-side sealing member 66 only by moving the slit 130a closer to the substrate W. In other words, once the first suction nozzle 130 is moved to a predetermined suction position, the Y-axis actuator 144 and the Z-axis actuator 146 do not need to operate.

Figure 37A:
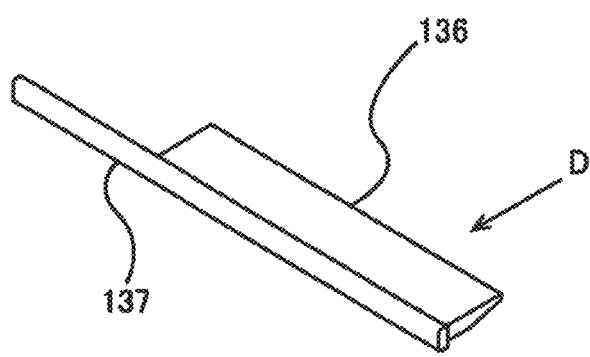
FIG. 37A is a plan view of a modification of the second suction nozzles.
Figure 37B:
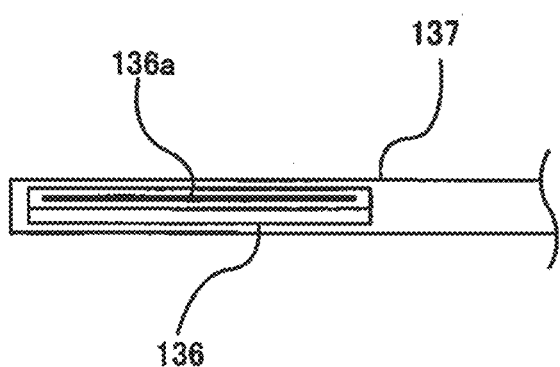
FIG. 37B is a view from a direction indicated by arrow D shown in FIG. 37A.

FIG. 37A shows a perspective view of a modification of the second suction nozzles 136, and FIG. 37B is a view from a direction indicated by arrow D shown in FIG. 37A. As shown in FIGS. 37A and 37B, the second suction nozzle 136 is constituted by a slit nozzle having a slit 136a defined in its tip end. The slit 136a extends horizontally parallel to the surface of the substrate W that is held by the substrate holder 8. The second suction nozzle 136 having the slit 136a is capable of more reliably sucking the processing liquid that remains on the surface of the substrate W.

Any of the various nozzles described above may be combined together appropriately. For example, both of the first suction nozzle 130 and the second suction nozzle 136 may be constituted by a slit nozzle for more efficiently sucking the processing liquid that remains on the surface of the substrate W.

While the first suction nozzle 130 is in a position facing the substrate W and the lower portion of the substrate-side sealing member 66 as shown in FIG. 32, the second suction nozzles 136 may be moved to a position (see FIG. 23) facing the lower end of the substrate holder 8. The first suction nozzle 130 and the second suction nozzles 136 may alternately or simultaneously suck the processing liquid to remove the processing liquid that has gathered on the lower end of the substrate holder 8 and an area in the vicinity thereof.

In the above embodiments, the processing liquid on the surface of the substrate W and the contact portion of the substrate-side sealing member 66 is sucked by the first suction mechanism 112 and the second suction mechanism 116. The same arrangement and structure may be used to suck the processing liquid that is attached to the surface of the substrate holder 8. A less amount of the processing liquid on the surface of the substrate holder 8 can result in a reduction in the contamination, which could be caused by the remaining processing liquid, in a next process. According to the present embodiment, the processing liquid is sucked and removed even when the substrate holder 8 is being transported in the horizontal direction. Therefore, the substrate holder 8 does not need to stay for allowing the processing liquid to drop off the substrate W. As a consequence, the throughput can be increased.

The present invention is also applicable to a plating apparatus wherein the substrate holder 8 is elevated out of the processing bath 110 and lowered into the processing bath 110 by a lifter which is provided separately from the transporter 100. The plating apparatus of this type may also have a suction nozzle disposed in a position facing the substrate holder 8 that has been elevated from the processing bath 110, so that the suction nozzle can suck the processing liquid remaining on the substrate W and the substrate holder 8 while the suction nozzle is moving in the horizontal direction together with the substrate holder 8.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims and equivalents.

What is claimed is:

1. A plating apparatus, comprising:
   a processing bath configured to store a processing liquid therein;
   a substrate holder comprising a sealing member configured to hold a substrate with the sealing member, the sealing member configured to press the substrate and to seal at least a portion of the substrate from contacting the processing liquid;
   a transporter configured to immerse the substrate holder comprising the sealing member in the processing liquid stored in the processing bath, raise the substrate holder comprising the sealing member out of the processing bath, and transport the substrate holder comprising the sealing member in a horizontal direction;
   a suction mechanism configured to suck the processing liquid remaining on the substrate held by the substrate holder; and
   a moving mechanism configured to move the suction mechanism relative to the substrate holder,
   the suction mechanism being mounted to the moving mechanism, the moving mechanism being mounted to the transporter, and the transporter being configured to move the suction mechanism and the moving mechanism together with the substrate holder comprising the sealing member in the horizontal direction while transporting the substrate holder comprising the sealing member in the horizontal direction.

2. The plating apparatus according to claim 1, wherein the moving mechanism includes an X-axis actuator configured to move the suction mechanism closer to and away from the substrate held by the substrate holder.

3. The plating apparatus according to claim 2, wherein:
   the suction mechanism includes
      a first suction mechanism configured to suck the processing liquid remaining on the sealing member and the substrate, and
      a second suction mechanism configured to suck the processing liquid remaining on a surface of the substrate; and
   the X-axis actuator includes
      a first X-axis actuator configured to move the first suction mechanism closer to and away from the substrate held by the substrate holder, and
      a second X-axis actuator configured to move the second suction mechanism closer to and away from the substrate held by the substrate holder.

4. The plating apparatus according to claim 3, wherein the moving mechanism further includes
   a Y-axis actuator configured to move the suction mechanism in the horizontal direction parallel to the substrate held by the substrate holder, and
   a Z-axis actuator configured to move the suction mechanism in a vertical direction.

5. The plating apparatus according to claim 4, wherein each of the Y-axis actuator and the Z-axis actuator comprises an electric actuator capable of moving the suction mechanism along a preset path.

6. The plating apparatus according to claim 3, wherein the first suction mechanism includes a single suction nozzle.

* * * * *